(12) United States Patent
Kolze et al.

(10) Patent No.: US 7,961,823 B2
(45) Date of Patent: Jun. 14, 2011

(54) SYSTEM AND METHOD FOR ADJUSTING MULTIPLE CONTROL LOOPS USING COMMON CRITERIA

(75) Inventors: Thomas Kolze, Phoenix, AZ (US); Bruce Currivan, Irvine, CA (US); Afshin Momtaz, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 1753 days.

(21) Appl. No.: 10/879,673

(22) Filed: Jun. 29, 2004

(65) Prior Publication Data

US 2005/0271137 A1 Dec. 8, 2005

Related U.S. Application Data

(60) Provisional application No. 60/576,371, filed on Jun. 2, 2004.

(51) Int. Cl.
*H04B 1/10* (2006.01)
*H04B 7/04* (2006.01)
*H04L 1/00* (2006.01)

(52) U.S. Cl. .......... 375/346; 375/233; 375/371
(58) Field of Classification Search ............... 375/232, 375/233, 326, 327, 340, 346, 348, 371, 373, 375/376
See application file for complete search history.

(56) References Cited

U.S. PATENT DOCUMENTS

| | | | | |
|---|---|---|---|---|
| 5,414,732 | A | * | 5/1995 | Kaufmann .................. 375/232 |
| 6,003,051 | A | * | 12/1999 | Okazaki ........................ 708/3 |
| 6,353,604 | B2 | * | 3/2002 | Grimwood et al. .......... 370/335 |
| 6,621,857 | B1 | * | 9/2003 | Belotserkovsky et al. ... 375/149 |
| 7,024,172 | B1 | * | 4/2006 | Murphy et al. .............. 455/324 |
| 2002/0080898 | A1 | * | 6/2002 | Agazzi et al. ............... 375/355 |
| 2002/0159350 | A1 | * | 10/2002 | Ogura et al. ............. 369/47.35 |
| 2005/0078780 | A1 | * | 4/2005 | Chou et al. .................. 375/350 |

\* cited by examiner

*Primary Examiner* — Young T. Tse

(57) ABSTRACT

Data error such as mean square error may be reduced in a system such as a communication receiver using a dithering algorithm that adjusts one or more parameters in the system. The dithering algorithm may be applied to more than one parameter in a nested manner. The dithering algorithm may be modified to immediately check the MSE after a parameter has been adjusted.

28 Claims, 17 Drawing Sheets

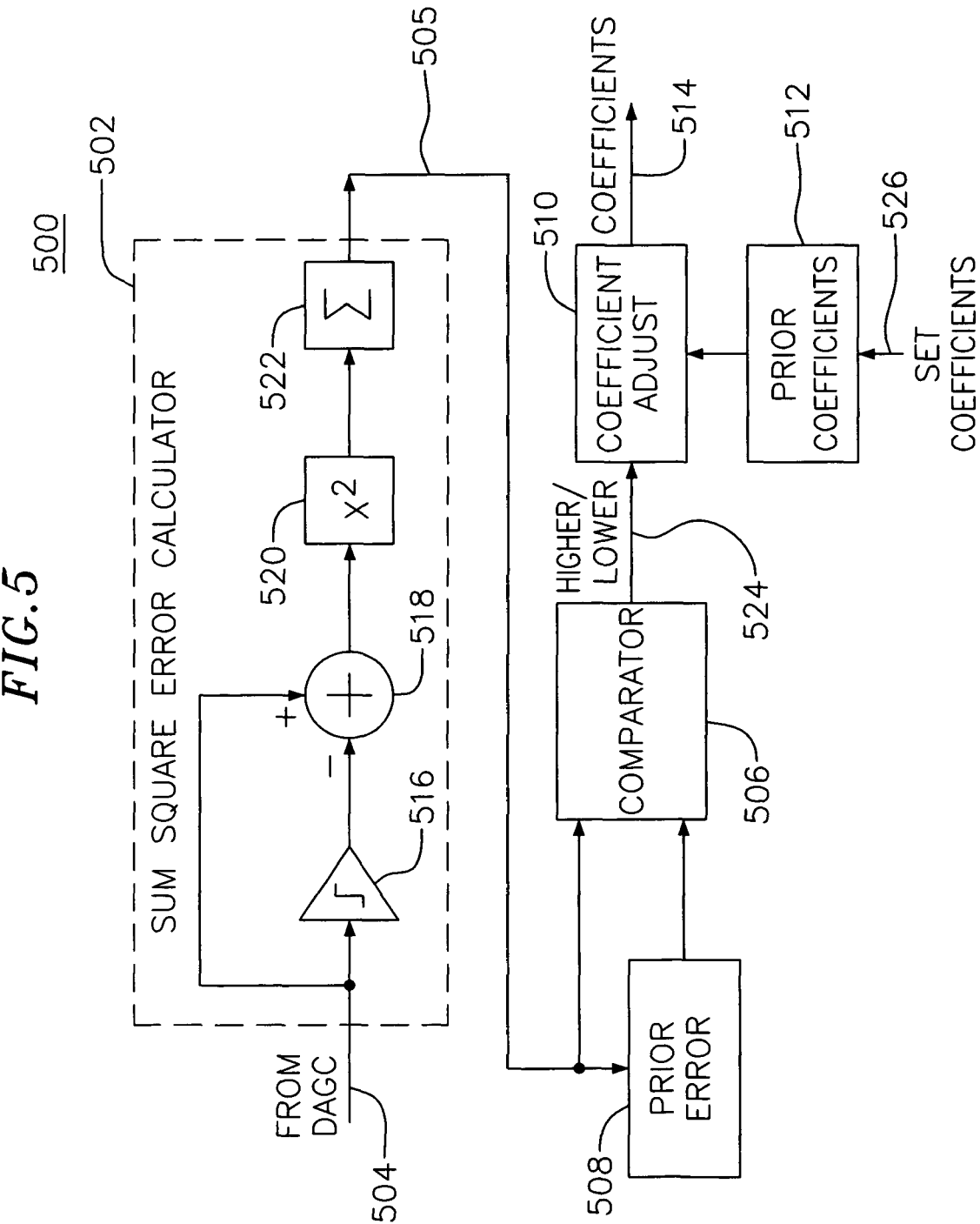

SYSTEM AND METHOD FOR ADJUSTING MULTIPLE CONTROL LOOPS USING COMMON CRITERIA

CROSS-REFERENCE TO RELATED APPLICATION(S)

This application claims the benefit of U.S. Provisional Patent Application No. 60/576,371, filed Jun. 2, 2004, the disclosure of which is hereby incorporated by reference herein.

TECHNICAL FIELD

This application relates to data communications and, more specifically, to a system and method for reducing errors in data signals by controlling multiple control loops using common criteria.

BACKGROUND

In a typical data communications system data is sent from a transmitter to a receiver over a communications media such as a wire or fiber optic cable. In general, the data is encoded in a manner that facilitates effective transmission over the media. For example, data may be encoded as a stream of binary data (e.g., symbols) that are transmitted through the media as a signal.

In many applications symbols in a data stream are corrupted as they pass through the media. For example, bandwidth limitations inherent in the media tend to create increasing levels of data distortion in a received signal. In particular, band-limited channels tend to spread transmitted pulses. If the width of the spread pulse exceeds a symbol duration, overlap with neighboring pulses may occur, degrading the performance of the receiver. This phenomenon is called intersymbol interference ("ISI"). In general, as the data rate or the distance between the transmitter and receiver increases, the bandwidth limitations of the media tend to cause more inter-symbol interference.

To compensate for such problems in received signals, conventional high speed receivers may include filters and equalizers that may, for example, cancel some of the effects of inter-symbol interference or other distortion. Moreover, some applications use adaptive filters or equalizers that automatically adjust their characteristics in response to changes in the characteristics of the communications media. Typically, the adaptation process involves generating coefficients that control the characteristics of the filter or equalizer. To this end, a variety of algorithms have been developed for generating these coefficients.

The least mean square ("LMS") algorithm is commonly used for optimizing coefficients for various applications such as a finite impulse response ("FIR") filter and an adaptive equalizer such as decision feedback equalizers ("DFE"). In general, an LMS algorithm generates adaptive coefficients by modifying the current coefficients based on an algorithm that takes into account current and prior samples of the received data. For example, for a two tap DFE the LMS algorithm may be described by the following equations:

$$g1(n)=g1(n-1)+\mu *e*y1 \quad \text{EQUATION 1}$$

$$g2(n)=g2(n-1)+\mu *e*y2 \quad \text{EQUATION 2}$$

where g(n−1) represents the coefficient immediately preceding coefficient (n), $\mu$ is a scalar that relates to, for example, the gain of a feedback loop and the speed with which the loop converges, e is an error signal, and y1 and y2 are prior samples of the received data.

The LMS algorithm is not suitable for applications where prior samples of the received data are not available. For example, a conventional continuous time filter does not generate prior states of the data passing through the filter. Accordingly, a variety of techniques may need to be used to adjust characteristics of components in a receiver.

In view of the above, a need exists for improved techniques for reducing errors in data signals, in particular in applications where multiple techniques may be used to control processing of the data signals.

SUMMARY

The invention relates to a system and method for reducing errors in data signals by using common criteria to adjust multiple control loops that control processing of the data signals. For convenience, an embodiment of a system constructed or a method practiced according to the invention will be referred to herein simply as an "embodiment." In one embodiment a system processes a received signal using a plurality of control signals that are adjusted in accordance with common error measurement criteria. For example, the system may include several processing components, the characteristics of each of which may be adjusted by a separate control signal. To improve the performance of the system each signal may be adjusted by comparing the performance of the receiver for various values of the control signals. In this case, the performance of the receiver is measured according to a particular error measurement criterion. Thus, each control signal is adjusted using common error measurement criteria.

In one embodiment the system is a communication receiver that processes a received signal and attempts to recover the original transmitted data from the received signal. In this case, the performance of the receiver may be measured by determining (or approximating or estimating, etc.) any error in the received data as compared to the transmitted data. The error criteria may include, without limitation, square error, bit error rate or absolute value error. Accordingly, the control signals may be adjusted based on calculations of such error. For example, the system may adjust the value of each control signal then compare the error in the system for these respective values. Optimum values for the control signals may then be identified as the combination of values that provides the smallest error.

In one embodiment the communication receiver includes a decision feedback equalizer with adjustable equalization coefficients and a clock recovery circuit with an adjustable phase and, in some embodiments, other adjustable processing components. In practice, these adjustable components may be interdependent. For example, adjusting a parameter of one component may affect an optimum value for an adjustable parameter of another component. By using common criteria for adjustment of these interdependent control loops, the system may provide improved stability as compared to conventional communication receivers. As an example, the adjustable parameters may each be adjusted to minimize some form of square error (e.g., mean square error) in the received signal.

One aspect of the invention relates to a system and method for reducing errors in data signals using a dithering algorithm. In some embodiments, a circuit continually adjusts one or more parameters in a system to reduce data errors (e.g., mean square error, "MSE") in the system. After adjusting a parameter, the circuit determines whether the error has decreased as a result of the adjustments. When an adjustment reduces the error, the circuit continues to adjust the parameter in the same direction (e.g., up or down). In contrast, when an adjustment increases the error, the circuit adjusts the parameter in the opposite direction.

In some embodiments, the dithering algorithm is applied to more than one parameter in a nested manner. For example, the circuit may first adjust a first parameter until the algorithm converges. In some embodiments, the algorithm may be deemed to have converged when a value of the first parameter is found that provides the "best" error. The circuit may then adjust a second parameter by one step, then repeat the dithering algorithm for the first parameter until the algorithm again converges for the first parameter. The circuit then determines whether the error has been reduced. If so, the circuit continues to adjust the second parameter in the same direction. If not, the circuit adjusts the second parameter in the opposite direction. This process is repeated until the algorithm for the second parameter converges.

In some embodiments, a circuit implements a dithering algorithm in a communication receiver to reduce the mean square error in received data. Here, the circuit controls one or more parameters of the components in the communication receiver. For example, the receiver may include a continuous time filter that has an adjustable bandwidth, a decision feedback equalizer that has an adjustable delay and a delay lock loop that has adjustable timing. By controlling one or more of these parameters using the dithering algorithm, the circuit may reduce the MSE in the received data.

Moreover, by using common criteria such as mean square error to adjust each of these loops the system may exhibit relatively good stability. Furthermore, these control loops may be incorporated into a receiver with a decision feedback equalizer that uses a mean square error-based algorithm (e.g., LMS) to adjust the equalization coefficients of the decision feedback equalizer. In this case, each of the control loops will be adjusted according to common error measurement criteria, namely square error (or more specifically in this example, mean square error). As a result, some of the stability problems encountered in conventional systems may be avoided.

In some embodiments, the dithering algorithm is modified to immediately check the MSE after a parameter has been altered. In this case, a circuit may not wait for convergence of a nested dithering algorithm for other parameters. If the MSE has increased, the parameter is immediately changed back to its prior value. If the MSE is the same or has decreased, the parameter is left at the new value. In this, the parameters may be maintained at a value that results in the lowest MSE rather than oscillating between that value and values that result in higher MSE.

BRIEF DESCRIPTION OF THE DRAWINGS

These and other features, aspects and advantages of the present invention will be more fully understood when considered with respect to the following detailed description, appended claims and accompanying drawings, wherein:

FIG. 5 is a simplified block diagram of one embodiment of a portion of a dithering algorithm circuit constructed in accordance with the invention;

Figure 1A:
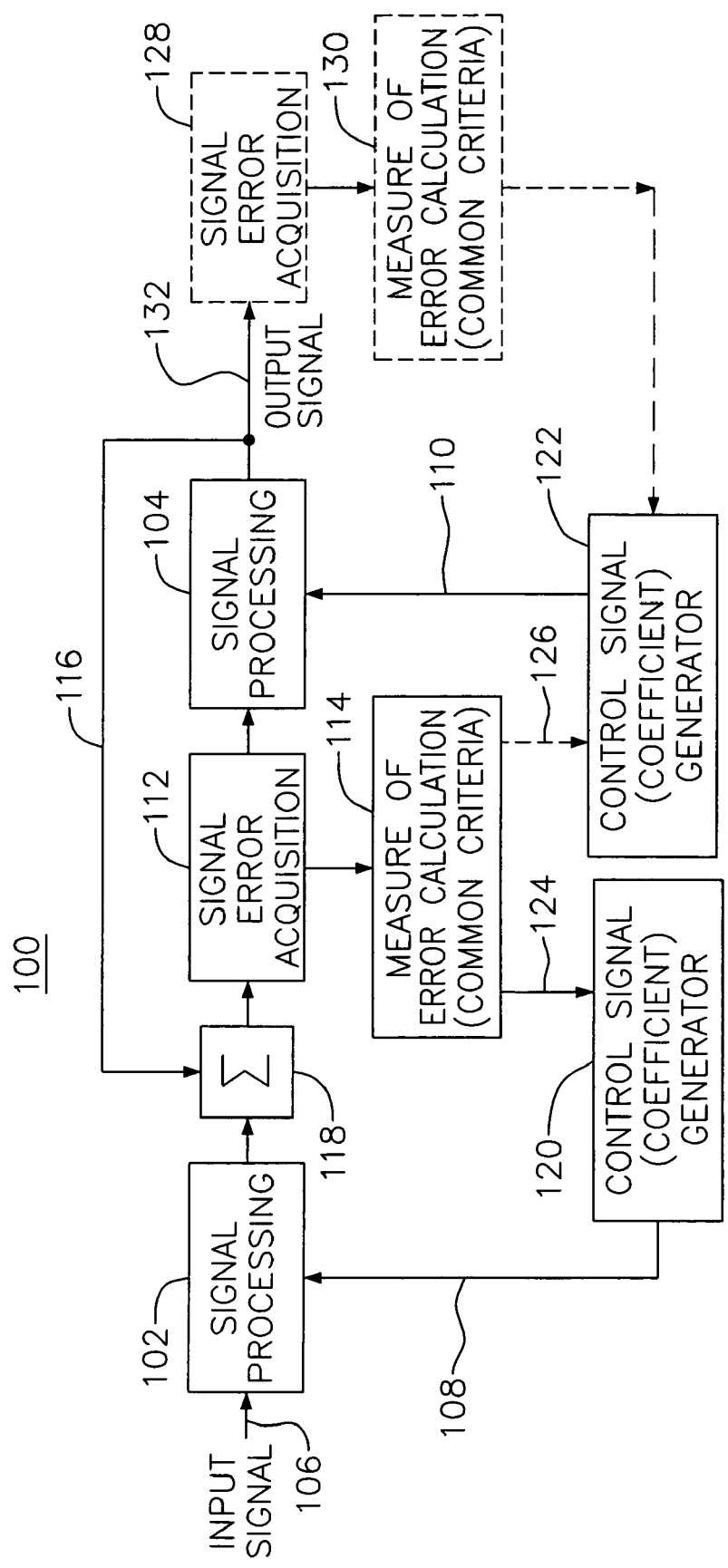
FIG. 1A is a simplified block diagram of one embodiment of a processing system incorporating control loops constructed in accordance with the invention.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention.

FIG. 1A is a simplified block diagram of one embodiment of a system 100 including several signal processing components 102 and 104 for processing an input signal 106. A processing component 102 or 104 may process the input signal 106 either in its original form or as processed by another processing component 102 or 104. Alternatively, a processing component 102 or 104 may provide processing that is used by other processing components 102 or 104. In either case, each processing component 102 and 104 affects the overall processing of the input signal 106.

One or more characteristics of the processing components 102 and 104 may be controlled by a control signal. For example, the processing component 102 may include amplifier, gain control, filter and/or equalization components. The characteristics of these components (e.g., gain of a gain control, bandwidth of a continuous time filter, or adaptive equalization of a feed forward equalizer) may then be adjusted to improve the performance of the system 100. In addition, the processing component 104 may include adaptive equalization, clock recovery and other components. The characteristics of these components also may be adjusted to improve the performance of the system 100.

In FIG. 1A the processing components 102 and 104 are controlled by control signals 108 and 110, respectively. The value of each control signal 108 and 110 is, in turn, adjusted according to a measure of error associated with the processed input signal. Thus, each control signal 108 and 110 forms part of a control loop that controls the operation of each processing component 102 and 104.

Typically, these control loops may be interdependent (i.e., interact with one another). For example, a change in the value of one control signal may affect the optimum value for another control signal. Consequently, instability in the system may result if the adjustment of the control signals is not performed properly.

In accordance with one aspect of the invention, the control signals 108 and 110 are adjusted in accordance with common error measurement criteria. For example, the control signals 108 and 110 may be adjusted based on a calculation of square error (e.g., mean square error or sum square error) associated with the processed input signal. Alternatively, the control signals 108 and 110 may be adjusted based on a bit error rate associated with the processed input signal. The control signals 108 and 110 also may be adjusted based on an absolute value error associated with the processed input signal. By adjusting the control signals 108 and 110 in this way, stability problems in the system may be avoided.

In practice, the error measurement criteria may be any criteria relating to a measure of "goodness" of the signal. For example, error associated with a signal generally indicates the accuracy with which the signal corresponds to another signal. A typical example involves data that is sent from one location to another. Due to the characteristics of the transmitting or receiving components or the transmission media, a receiver may not be able to recover the original data from a received signal with 100% accuracy. In this case, measure of error calculations may be made that provide an indication as to the accurately with which the receiver is recovering data from the received signal.

To this end the system 100 may include a signal error acquisition component 112 and a measure of error calculation component 114. The signal error acquisition component 112 extracts error information from the signal being processed. This error information is obtained from the processed signal so that the effect of each processing component 102 and 104 on the signal may be monitored.

The embodiment of FIG. 1A illustrates that the signal may be affected by a feedback signal from a processing component. For example, the output of processing component 104 is fed back via line 116 to a summer 118. As a result, the error acquired by the signal error acquisition component 112 may reflect processing performed by processing component 104.

The error calculation component 114 generates error information that is used by control signal (e.g., coefficient) generator components 120 and 122 to adjust the control signals 108 and 110, respectively. According to one aspect of the invention, the error calculation component 114 generates error information for each generator component 120 and 122 in accordance with common error measurement criteria (e.g., square error).

The signal error acquisition component and the error calculation component may obtain error information from various locations in the system. For example, as represented by the dashed boxes 128 and 130 these components may be configured to obtain error information from an output signal 132 generated by the system 100.

FIG. 1A also illustrates that an error calculation component may provide error information to one or more control signal generators. For example lines 124 and 126 indicate that the error calculation component 114 may provide error information to control signal generator 120 and, optionally, control signal generator 122.

The system may optionally include more than one signal error acquisition component and/or error calculation component. In some embodiments, different error calculation components may be used to provide error information to different control signal generators. For example, the error calculation component 114 may provide error information to control signal generator 120 and the error calculation component 130 may provide error information to control signal generator 122.

Figure 1B:
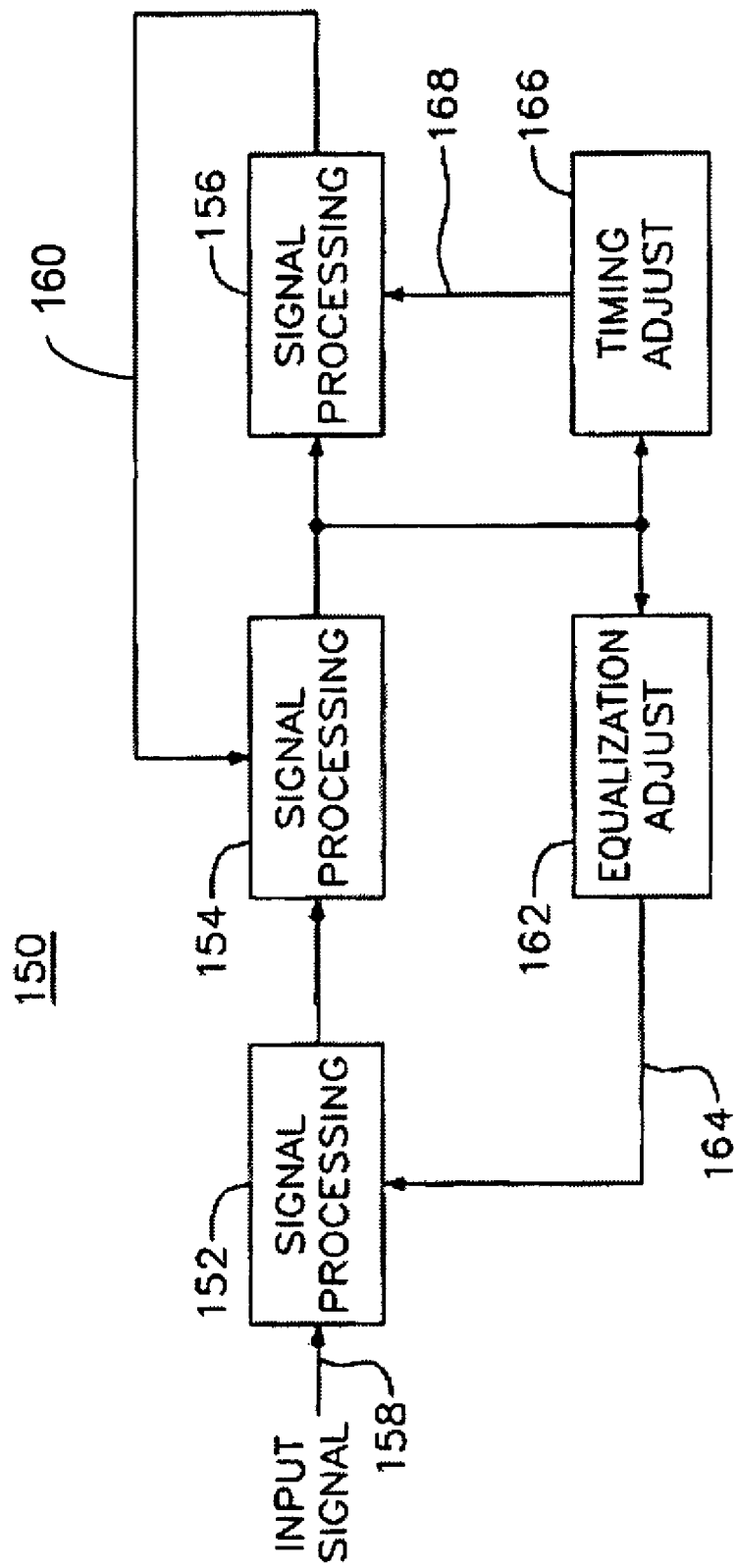
FIG. 1B is a simplified block diagram of one embodiment of a processing system incorporating control loops constructed in accordance with the invention.

It should be appreciated that the techniques described above may be used in conjunction with a variety of processing components and system architectures. For example, FIG. 1B illustrates a system 150 including several signal processing components 152, 154 and 156 for processing an input signal 158. The processing component 152 may include an adaptive equalizer such as a feed forward adaptive equalizer or a decision feedback adaptive equalizer. The processing component 154 may include a synchronous sampler that passes one (or two or any fixed ratio M/N) samples per symbol. The processing component 156 may include a clock recovery component that generates a timing control signal 160 for the sampler 154. An equalization adjust component 162 may adapt the coefficients of the adaptive equalizer 152 in accordance with, for example, a least mean square algorithm. These coefficients may then be provided to the adaptive equalizer 152 via control signals 164. A timing adjust component 166 may provide collection or measurement of mean square error, as a bias in the feedback timing 160 is introduced and dithered, and adjusted, in conjunction with a control signal 168, to minimize the overall mean square error of the system 150.

Figure 2:
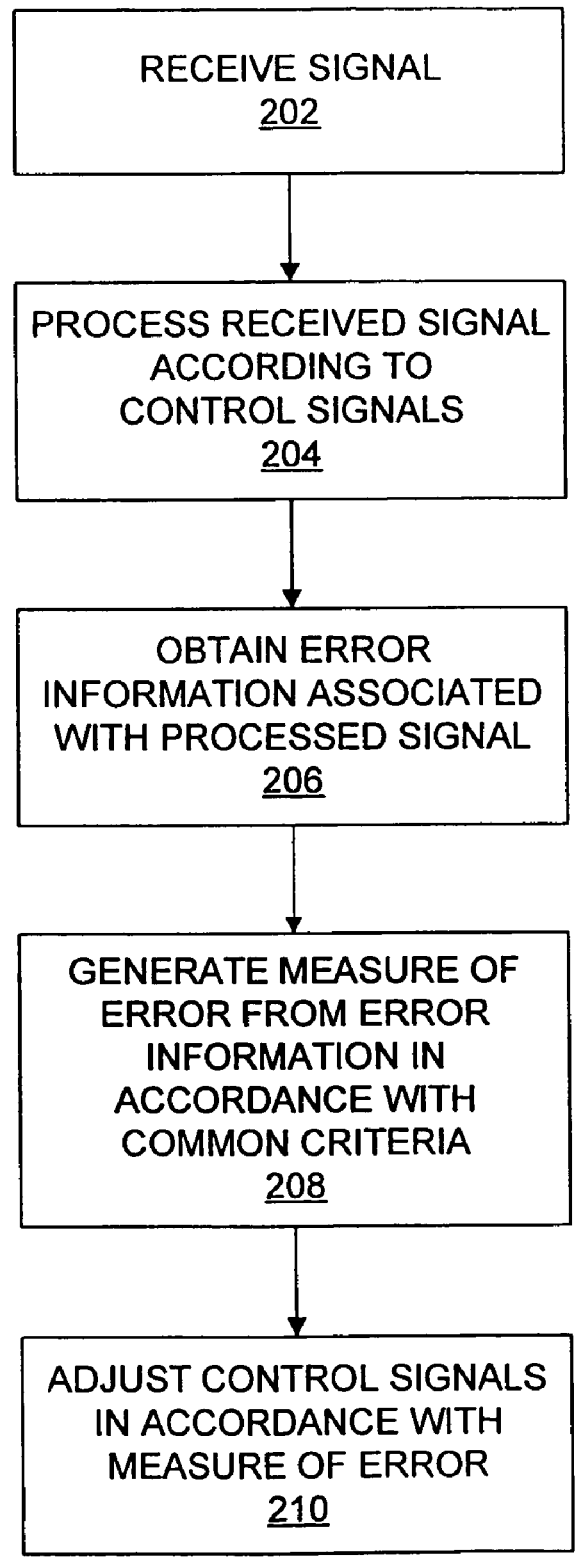
FIG. 2 is a flow chart of one embodiment of control operations that may be performed in accordance with the invention.

The operation of the system 100 of FIG. 1A will be described in more detail in conjunction with the flowchart of FIG. 2. As represented by block 202 the system 100 initially receives an input signal 106 to be processed. In a typical embodiment the input signal 106 consists of a serial data stream. It should be appreciated, however, that the teachings herein are applicable to other signal formats.

As represented by block 204 the system 100 processes the input signal 106 in accordance with several control signals 108 and 110. As discussed above, the system 100 may include several processing components 102 and 104 that perform various operations to, for example, attempt to accurately extract the original data stream from the received signal stream. To optimize the performance of the system, the characteristics of the components 102 and 104 may be adjusted by the control signals 108 and 110.

As represented by blocks 206-210, the control signals 108 and 110 may be adjusted to, for example, minimize an error criteria associated with the processed signal. In one embodiment, the signal error acquisition component 112 samples the signal stream and generates an error signal indicative of the difference between the value of the sampled signal and an expected value for the signal (block 206).

The error calculation component 114 processes the error signals to generate measure of error information (e.g., MSE) that is used to adjust the control signals 108 and 110 (block 208). In some applications the same error information may be used to adjust each of the control signals 108 and 110. In other applications the error calculation component 114 may generate different error information for different control signals. In either case, as discussed above the error information is associated with common error measurement criteria.

In an alternative embodiment, the signal error acquisition component 128 and the error calculation component 130 may generate a bit error rate associated with the processed data. In this case, the bit error rate may form the basis of the error information that is used for adjusting each of the control signals 108 and 110.

As represented by block 210, the control signal generators 120 and 122 adjust the control signals (e.g., modify coefficient values) 108 and 110 according to the error information. In a typical example, a control signal generator adjusts the value of a control signal to minimize the magnitude of the measure of error information (e.g., MSE). In addition, adjustment of the various control loops may need to be coordinated because the control loops are interdependent. As discussed herein, in some embodiments this may be accomplished using a dithering algorithm.

A system constructed according to the teachings herein also may incorporate other techniques for adjusting the control signals. One example of an alternative technique is a sweep algorithm. Here, the system may be repeatedly configured using various combinations of control values. The error information is logged for each of these combinations. At the end of the sweep, the combination of control values that resulted in the "best" error information (e.g., lowest MSE) is used to adjust the control signals. Depending upon the application, this sweep process may be repeated to continually update the control signals 108 and 110.

Figure 3:
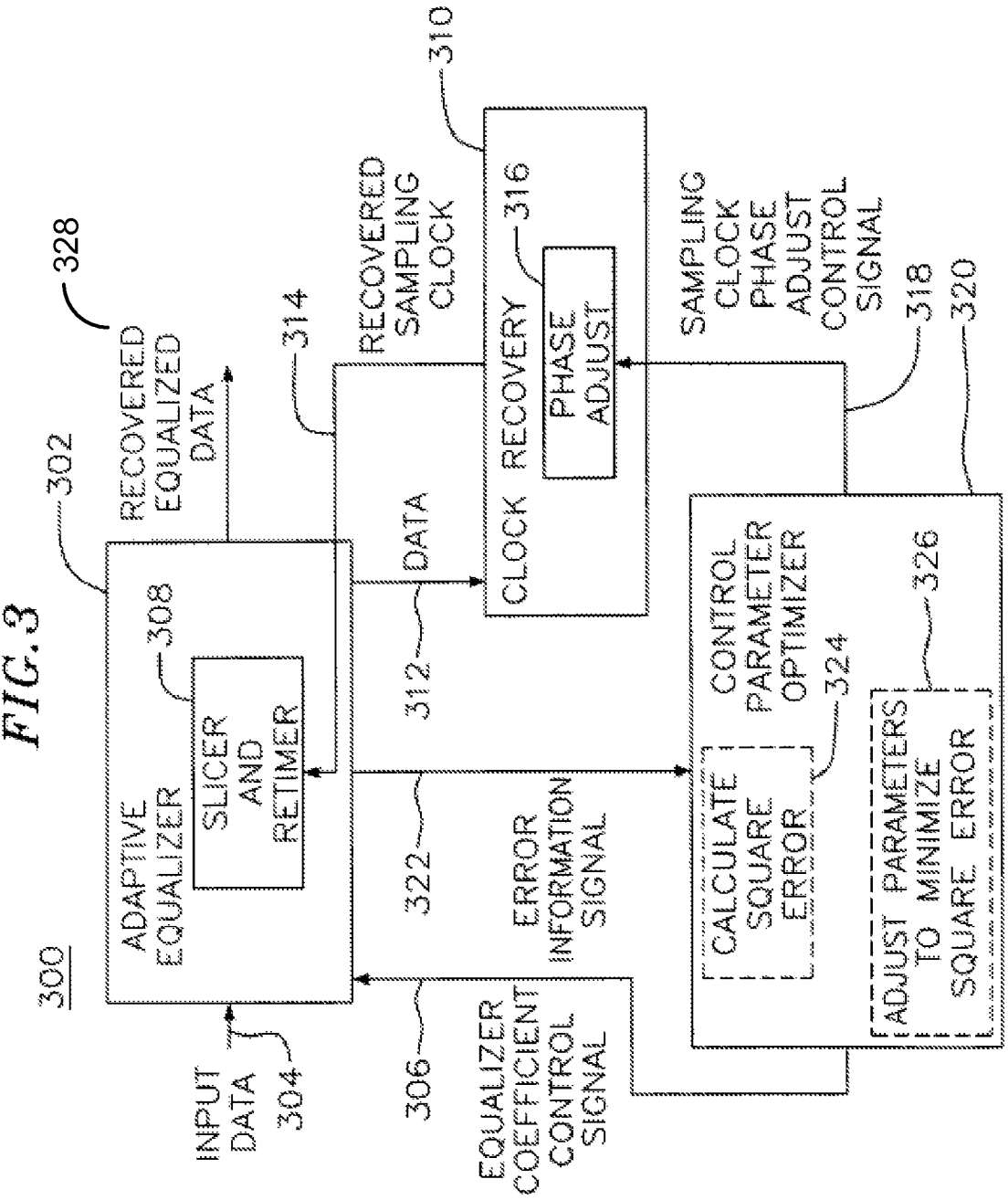
FIG. 3 is a simplified block diagram of one embodiment of a communication receiver constructed in accordance with the invention.

Referring now to FIG. 3, one embodiment of a communication receiver 300 that uses common error measurement criteria to adjust multiple loops will be discussed. The receiver 300 includes an adaptive equalizer 302 that equalizes input data 304 according to the values of one or more equalization coefficients. The equalization coefficients are provided to the equalizer via a control signal 306. The equalizer 302 includes a slicer and retimer circuit 308 that samples the equalized data to provide recovered data 328.

The receiver 300 also includes a clock recovery circuit 310 that recovers a clock signal 314 from input data 312 (e.g., input data 304 that has been equalized). In general, "clock recovery" may encompass recovering symbol timing and/or bit timing. As an example, clock recovery may include synchronous sampling of a symbol stream, with some fixed ratio of samples per symbol in the sampler, such as one sample per symbol, two samples per symbol, or three samples every two symbols, etc.

The recovered clock signal 314 provides the sampling clock for the retimer. To improve the performance of the receiver, the clock recovery circuit 310 includes a phase adjust circuit 316 that adjusts the phase of the recovered clock signal 314 according to the value of a control signal 318.

A control parameter optimizer circuit 320 generates the control signals 306 and 318 based on a square error associated with equalized data. In one embodiment, a soft decision signal from the equalizer serves as an error information signal 322 for a square error calculator 324 in the optimizer circuit 320. The optimizer circuit 320 also includes one or more components 326 that generate control parameters (e.g., coefficients) for the equalizer and clock recovery control signals 306 and 318 to minimize the square error.

For example, the optimizer circuit 320 may implement a least mean square algorithm that generates the equalization coefficients. Thus, the optimizer circuit 320 adjusts the equalization coefficients to find the values that result in the smallest mean square error.

In addition, the optimizer circuit 320 may implement a mean square error dithering algorithm to adjust the phase of the clock recovery circuit 310. Here, the optimizer circuit adjusts the phase adjust coefficients to find the value that results in the smallest mean square error.

Alternatively, in a system that incorporates interpolators an optimizer circuit may provide LMS operations as discussed above to generate a bias adjustment for the clock recovery circuit. For example, the optimizer circuit may multiply an LMS tap update by $\mu$ and use this value to adjust the bias. In this case, the bias adjust operates in a similar manner as the phase adjust; namely, it adjusts the retimer sample time away from its "normal" sample time.

By adjusting the adaptive equalizer 302 and the clock recovery circuit 310 in accordance with a common criteria of minimizing means square error, the receiver of FIG. 3 may exhibit superior stability and performance characteristic as compared to some conventional receivers that combine an adaptive equalizer with a clock recovery circuit.

Conventionally, the combination of certain clock recovery techniques with traditional adaptive equalization approaches leads to a stability problem, wherein the end result is that the equalizer coefficients "drift" such that the symbol being "decisioned" moves toward an edge of the equalizer delay registers. The fundamental cause of the instability is that one control value, the sample timing, is being driven by two different algorithms, with two distinct optimization criteria.

A conventional adaptive equalizer typically adjusts coefficients to minimize the squared error at the sample time it is provided; in doing this, often the result is a misshapen waveform between the sample times. In particular, asymmetry may arise in the waveform. This asymmetry may in some cases have "zero crossings" such that the time between the zero crossing that is earlier than the sample and the zero crossing that is later than the sample are different. In any case, asymmetry in the waveform often results in the clock recovery circuit attempting to reposition the sample time to another point in the waveform, such as midway between zero crossings in some cases (as an example).

If the adaptive equalizer adjusts its coefficients to minimize the mean square error for a given sample timing, and the resulting overall waveform causes the clock recovery circuit to force a change in the sample timing, then there is a potential for instability, due to the different criteria for "optimality" of the two algorithms.

In addition, some conventional adaptive equalizers can adjust their coefficients to (over some range) impart a time delay or advance, repositioning the "eye opening," or point of least squared error of the waveform. An adaptive equalizer, while operating to open the "eye" as much as possible at its provided sample time, will also attempt to delay or advance the waveform to position the greatest eye-opening over the provided sample time.

As a result, a waveform with an asymmetry wherein the clock recovery circuit will try to push the sample time to midway between the zero crossings, combined with an adaptive equalizer algorithm that will delay or advance the waveform to put the (not-midway) max eye-opening over the sample time, will result in the clock recovery circuit continually delaying (or advancing) the sample time, while the adaptive equalizer continually delays (or advances) the waveform via its coefficients. Since practical equalizers have finite register length, this process cannot go on forever, and eventually the adaptive equalizer may run out of delay (or advancement) it can introduce, resulting in a degraded operating point.

Some techniques have been developed to address this problem including the inclusion of bias voltages added to the clock recovery circuit (which then adjusts the slicer sample time away from the "optimal" value it would "normally see"), with various ad hoc schemes adjusting the bias voltage. One traditional approach attempts to add a bias voltage to the clock recovery circuit which will tend to center the "mass" of the equalizer taps around one of the tap positions; other alternatives use only the "mass" in the two taps adjacent to the desired "symbol being decisioned" tap. These conventional ad hoc rules and approaches, however, may fail in some conditions, and perform poorly in others.

In accordance with one aspect of the invention, the clock recovery phase adjust moves the sampling away from the "zero crossing" time driven by the clock recovery circuit's inherent phase detector S-curve. By "repositioning" the clock recovery S-curve in this way, stability may be introduced where it did not exist before.

In addition, by using dithering to control the amount of "repositioning" to minimize the MSE this approach may stabilize the clock recovery circuit while maintaining a figure-of-merit (MSE) for the receiver which is highly related to overall performance.

Moreover, the adaptive equalizer and the clock recovery phase are both optimized to achieve minimum squared error. By making the overriding criterion for positioning the clock recovery phase to be MSE, or minimum squared error, rather than being driven by, or related to, the shape of the waveform itself, competing criteria may be eliminated from the receiver.

Even though the adaptive equalizer may be using an LMS algorithm, or some other means of achieving this criterion, and the clock recovery phase positioning may be using dithering to achieve its criterion, both are using the same fundamental criterion (MSE) for optimization. As long as the MSE surface is smooth and contains a global minimum, and steps are provided to walk out of any local minima that might "trap" the coefficients and timing (if any exist), the system may achieve the optimal performance of the adaptive equalizer afforded with its most favorable timing. In this fashion, by using MSE to optimize all the parameters, including the clock timing, and by examining the MSE "surface" for local minima (and introducing means for stepping out of such), and with appropriate design of the convergence speeds of the algorithms driving the various parameters, stability may be guaranteed. Implementation of these above techniques will be described in more detail in conjunction with the embodiments that follow.

Figure 4:
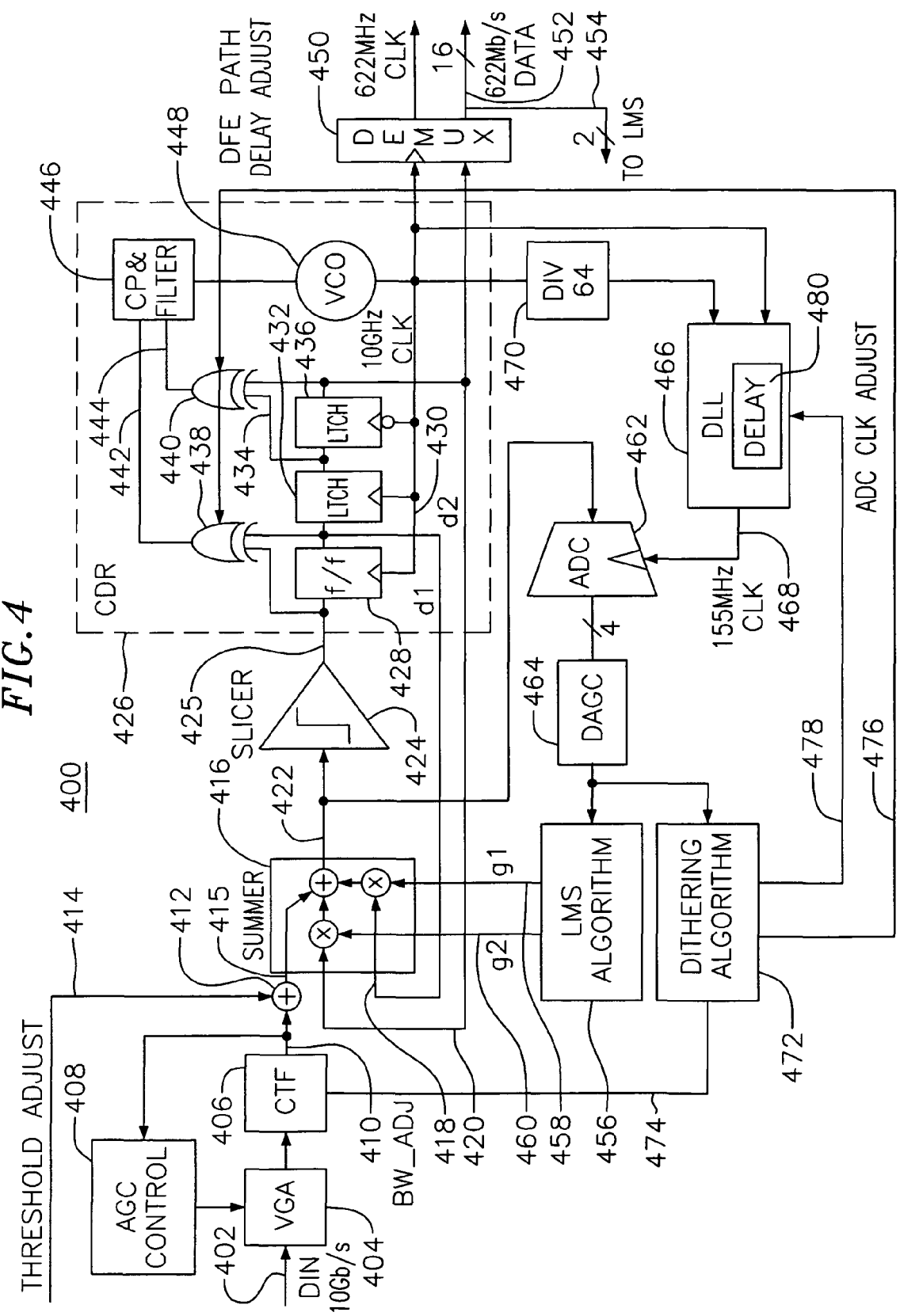
FIG. 4 is a simplified block diagram of one embodiment of a communication receiver constructed in accordance with the invention.

FIG. 4 is a simplified block diagram of one embodiment of a communication receiver 400 that incorporates four interdependent control loops each of which is adjusted in accordance with a square error associated with a received signal. The described embodiment relates to a 10 Gbit receiver that employs an adjustable continuous time filter and a decision feedback equalizer to reduce errors in a received signal. The receiver 400 also includes a clock recovery circuit and an analog to digital clock circuit, both of which include mechanisms for adjusting the phase of the generated clock. It should be appreciated, however, that the teachings herein are applicable to other applications, architectures and data rates.

In the embodiment of FIG. 4, a dithering algorithm circuit 472 generates several signals to control the operations of various components in the receiver 400. For example a bandwidth adjust signal 474 controls the bandwidth of a continuous time filter ("CTF") 406. A delay adjust signal 476 adjusts the delay of a clock 430 generated by a clock and data recovery circuit ("CDR") 426. In addition, a clock adjust signal 478 controls the timing of a clock 468 generated by a delay lock loop ("DLL") 466 for an analog to digital converter ("ADC") 462.

In some embodiments, the dithering algorithm circuit 472 modifies the signals 474, 476 and 478 according to a mean square error associated with a received data signal. In FIG. 4, the mean square error is calculated from a soft decision signal 422 generated by a summer 416.

The dithering algorithm circuit 472 may reduce the MSE in the receiver 400 by measuring the MSE, then adjusting one or more of the signals 474, 476 and 478, then re-measuring the MSE to compare the new MSE with the prior MSE. If the MSE decreased, the circuit 472 continues to adjust the signals in the same direction (e.g., up or down) as before. If the MSE increased, the circuit 472 adjusts the signals in the opposite direction. The following equation describes one example of a dithering algorithm:

$$c(n)=c(n-1)+u(n)$$

$$u(n)=u(n-1) \text{ if } MSE(n)<MSE(n-1)$$

$$u(n)=-1*u(n-1) \text{ if } MSE(n)>MSE(n-1) \quad \text{EQUATION 3}$$

The operation of the dithering algorithm circuit 472 will now be described in more detail in conjunction with an explanation of the operation of the components in the receiver 400.

Upon receiving an input data signal 402 from, for example, an optical channel, the receiver 400 initially amplifies and filters the signal 402. A variable gain amplifier ("VGA") 404 amplifies the input data signal 402 and provides the amplified data signal to the continuous time filter 406. The continuous time filter 406 filters the data signal using, for example a low pass filter that has an adjustable bandwidth. In the embodiment of FIG. 4, the dithering algorithm circuit 472 uses the bandwidth adjust signal 474 to control the bandwidth of the continuous time filter 406. As a result, the dithering algorithm circuit 472 may reduce the mean square error of the received signal.

An example of a continuous time filter having an adjustable bandwidth is disclosed in U.S. patent application Ser. No. 10/774,725, filed Feb. 9, 2004, now U.S. Pat. No. 7,330,508, the disclosure of which is hereby incorporated by reference herein. An example of a variable gain amplifier and a continuous time filter is disclosed in commonly owned U.S. patent application Ser. No. 10/841,766, filed May 7, 2004, now U.S. Pat. No. 7,034,606, entitled A NOVEL VGA-CTF COMBINATION CELL FOR 10 GB/S SERIAL DATA RECEIVERS, the disclosure of which is hereby incorporated by reference herein.

A filtered data signal 410 from the continuous time filter 406 is provided to an automatic gain control ("AGC") circuit 408. Under the control of the automatic gain control circuit 408 the variable gain amplifier 404 may appropriately amplify or attenuate small or large amplitude input signals, respectively, to generate an output signal having relatively constant amplitude.

The filtered output signal 410 also is provided to an adder circuit 412. The adder circuit 412 combines a threshold adjust signal 414 with the signal 410 to adjust the level of the signal 410. In this way the threshold level of incoming symbols may be adjusted to enable more effective sampling of the symbols in the decision feedback equalizer.

A data signal 415 from the adder circuit 412 is provided to a two tap decision feedback equalizer and clock and data recovery circuit. The summer 416 combines the data signal 415 with two equalized feedback signals 418 and 420 to generate the soft decision data signal 422. A slicer 424 converts the soft decision data signal 422 to a binary data signal 425.

The binary data signal 425 drives a pair of flip flops (flip-flop 428 and latch pair 432 and 436). In this embodiment, the flip-flop 428 and latch pair 432 and 436 perform retiming functions for decision feedback equalization and perform phase detection operations for clock and data recovery.

The clock and data recovery circuit 426 incorporates a phase lock loop circuit to extract the 10 GHz clock signal 430 (in this 10 Gbps example) from the binary data signal 425 by, for example, aligning the rising edge of the extracted clock with transitions in the binary signal 425. In this way, the clock and data recovery circuit 426 may maintain the proper timing relationship between the binary data signal 425 and the clock signal 430 that clocks the binary data signal 425 into the flip-flop 428 and latch pair 432 and 436.

The phase lock loop circuit includes a phase detector (discussed below), a charge pump and filter 446 and a voltage controlled oscillator ("VCO") 448, the operation of each of which may be summarized as follows. The voltage controlled oscillator 448 generates the clock signal 430 that is fed back to the phase detector. The phase detector compares the transition edge of the binary data signal 425 with an edge of the clock 430 and generates corresponding phase error signals 442 and 444 that are sent to the charge pump. The charge pump produces a current that corresponds to the phase error signals and provides this current to the loop filter. The loop filter removes selected undesirable frequency components from the current signal and sends a corresponding voltage signal to the voltage controlled oscillator 448. The voltage controlled oscillator 448 then adjusts the phase of the clock signal 430 according to this voltage signal.

In FIG. 4, the phase detector includes the flip flop 428, latch pair 432 and 436 and a pair of XOR gates 438 and 440. The binary data signal 425 and the data output signal 418 from the flip-flop 428 are the input signals for the XOR gate 438. The data output signal 434 from the latch 432 and the data output signal 420 from the second latch 436 are the input signals for the XOR gate 440.

By comparing the binary data signal 425 with the clocked outputs of the flip flop 428 and latch pair 432 and 434 the XOR gates 438 and 440 generate phase error signals 442 and 444, respectively, that drive the charge pump and filter 446. In some embodiments, the XOR gate 438 may generate the signal 442 with a pulse width proportional to data/clock phase error. In addition, the XOR gate 440 may generate a signal that is used as a reference for phase error evaluation.

The phase lock loop may be controlled to adjust the phase of the clock 430. That is, the signal 476 may be used to create an offset in the detected phase relationship between the clock signal 430 generated by the voltage control oscillator 448 and the binary data signal 425. For example, if the phases of the binary data signal 425 and the clock signal 430 of the voltage control oscillator 448 were perfectly aligned and the value of the signal 476 called for a five degree phase offset, the phase detector would output phase error signals 442 and 444 corresponding to a five degree phase difference between the two signals.

In some embodiments this phase shift may be used to adjust the delay in the decision feedback equalizer loop. For example, the delay through the decision feedback equalizer feedback loops may be adjusted to provide the feedback signals 418 and 420 to the summer 416 at a desired point in time relative to the data signal 415. As a result, the dithering algorithm circuit 478 may further reduce the mean square error of the received signal.

In some embodiments the signal 476 may be used to adjust the phase error signals 442 and 444 output by the phase detector. Examples of decision feedback equalizers with adjustable delay are disclosed in U.S. patent application Ser. No. 10/774,725, filed Feb. 9, 2004, the disclosure of which is hereby incorporated by reference herein.

As mentioned above, the flip flop 428 and latch pair 432 and 436 comprise the flip flops for the decision feedback equalizer that recover data from the binary data signal 425. Here, the clock signal 430 is used to clock the binary signal 425 into the flip-flop 428. In addition, the clock signal 430 clocks the output signal 418 from the flip-flop 428 into a second flip-flop consisting of the latch pair 432 and 436. In this two tap decision feedback equalizer implementation, the output of the second flip-flop provides a recovered data signal 420 that consists of equalized data that has been recovered from the incoming data signal 402.

A demultiplexer ("DEMUX") 450 demultiplexes the recovered data signal 420 to generate parallel data signals that are clocked at a slower rate. For example, in FIG. 4 the demultiplexer 450 generates sixteen parallel data signals 452 at a rate of 622 Mbits per second ("Mbps").

The data outputs signals from the two flip-flops also provide the DFE tap signals for the DFE feedback loop. Specifically, the output signals 418 and 420 are multiplied by equalization coefficients g1 458 and g2 460 (typically negative numbers) and the resulting scaled equalized feedback signals are added by the summer 416 with the data signal 415 as discussed above. Thus, the summer 416 typically subtracts a scaled version of the previous symbols from a current (that is, current, in time) symbol to reduce or eliminate channel induced distortion such as inter-symbol interference.

In general, the values of the equalization coefficients depend on the level of inter-symbol interference that is present in the incoming data. Typically the absolute value of an equalization coefficient (usually a negative number) increases with increasing inter-symbol interference. In some embodiments a least mean square ("LMS") algorithm circuit 156 calculates an error associated with an equalized signal (e.g., the soft decision signal 122) and adjusts the values of the equalization coefficients in accordance with the error.

As mentioned above, an error signal may be generated from the soft decision signal 422. In FIG. 4, the analog to digital converter 462 samples the soft decision signal 422 to generate digital signals (four in this case) that are provided to a digital automatic gain control circuit ("DAGC") 464. The digital output of the digital automatic gain control circuit 464 is provided to the LMS algorithm circuit 456 and the dithering algorithm circuit 472.

In the embodiment of FIG. 4, the components 456, 464 and 472 are implemented in the digital domain. Accordingly, these components may be implemented, for example, as a state machine, a processor with associated software or other known structures.

The analog to digital converter 462 samples the soft decision signal 422 using a 155 MHz clock signal 468 generated by the delay lock loop 466. The relative phase of the clock signal 468 determines the point in time in a given symbol at which the analog to digital converter 462 samples the symbol. The optimum point in time to sample a symbol may depend on the characteristics of the channel.

The delay lock loop 466 includes a delay circuit 480 that may be used to control the phase delay of the clock signal 468. Thus, the dithering algorithm circuit 472 may adjust the signal 478 to vary the point at which the analog to digital converter 462 samples symbols from the soft decision signal 422. In this way the analog to digital converter 462 may be controlled to sample at approximately the same point in time as the slicer/retimer. As a result, the dithering algorithm circuit 472 may further reduce the mean square error of the received signal.

FIG. 5 depicts one embodiment of a portion of a dithering algorithm circuit 500. Briefly, the dithering operations performed by the circuit 500 include calculating a sum square error ("SSE"), changing the value of a control coefficient to adjust the characteristics of one of the components in the receiver 400 (FIG. 4), re-calculating the SSE, comparing the prior SSE and the new SSE, then re-adjusting the coefficient accordingly.

The circuit 500 includes a sum square error calculator 502 that processes the digital signals 504 received from the digital automatic gain control circuit 464 (FIG. 4) to generate a sum square error signal 505. By calculating an SSE rather than an MSE, the circuit 500 avoids an extra processing step of scaling the SSE to a mean value.

The SSE calculator 502 generates an initial error signal using an adder 518 that subtracts the expected value of a received signal 504 as generated by component 516 from the actual value of the received signal 504. A squaring circuit 520 squares the initial error signal. A summing circuit 522 sums the squared error signals to generate the SSE signal 505.

Based on a comparison of SSE signals 505, the circuit 500 generates a coefficient 514 that is used to generate a control signal as discussed above, for example, in conjunction with FIG. 4. A comparator 506 compares the current SSE signal 505 with a prior value of the SSE signal that is stored, for example, in a data memory 508. The comparator 506 generates a signal 524 indicative of whether the current SSE is higher or lower than the prior SSE. Based on the value of the signal 524 a coefficient adjust circuit 510 adjusts the coefficient 514 up or down from its prior value. The prior value of the coefficient may be stored, for example, in a data memory 512.

As represented by the signal 526, the receiver 400 may set the value of the coefficient. For example, during reset or after the phase lock loop in the DFE loses lock, the receiver 400 may set the coefficient to a default value that enables the phase lock loop to regain lock.

In some embodiments, the circuit 500 may be used to adjust the coefficients for all of the control signals (e.g., signals 474, 476 and 478 in FIG. 4). In another embodiment described in conjunction with FIG. 8, separate comparators and associated circuits may be used for each control signal.

Figure 6A:
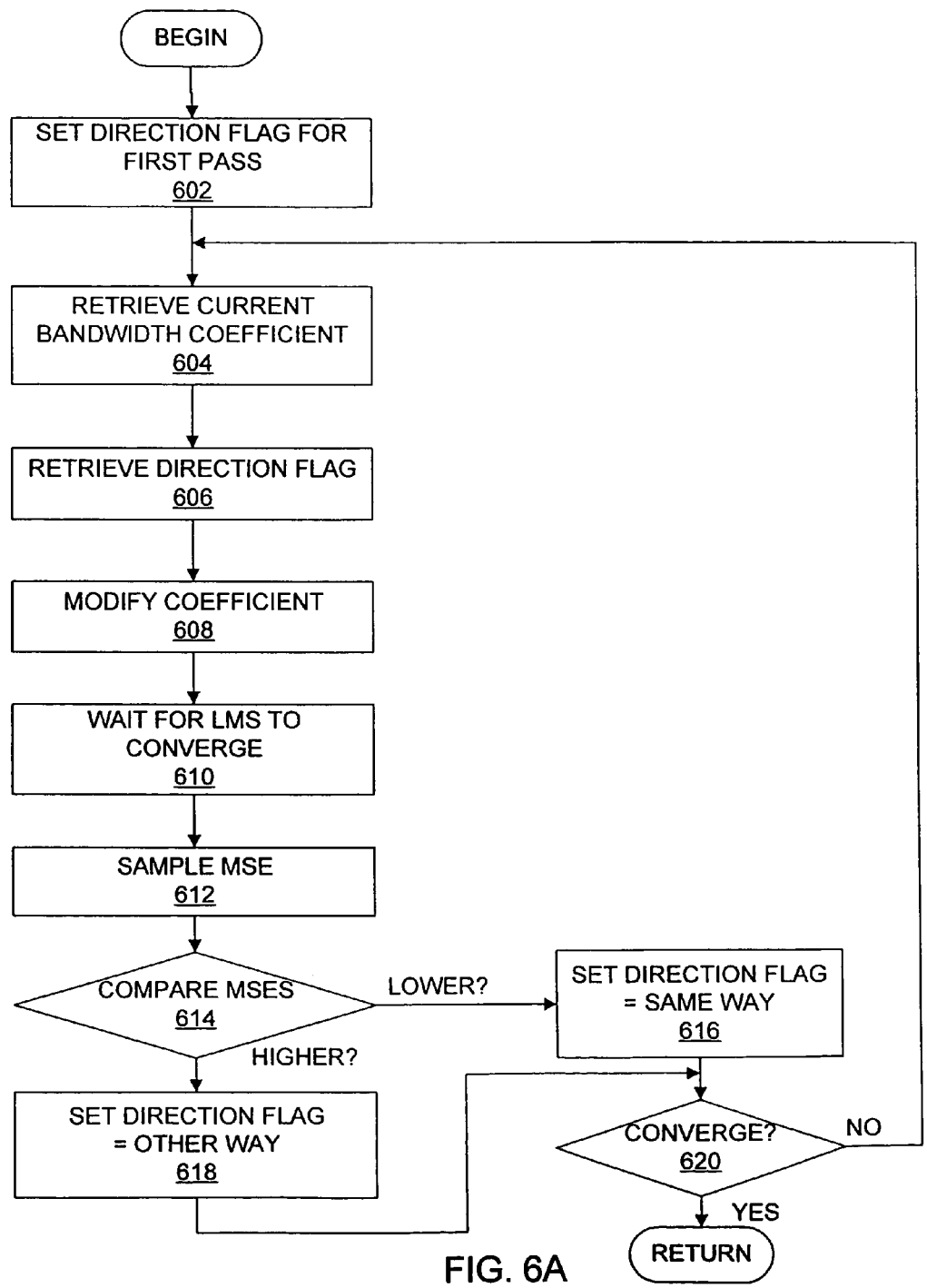
FIG. 6, consisting of FIGS. 6A, 6B and 6C, is a flow chart of one embodiment of dithering operations that may be performed in accordance with the invention.
Figure 6B:
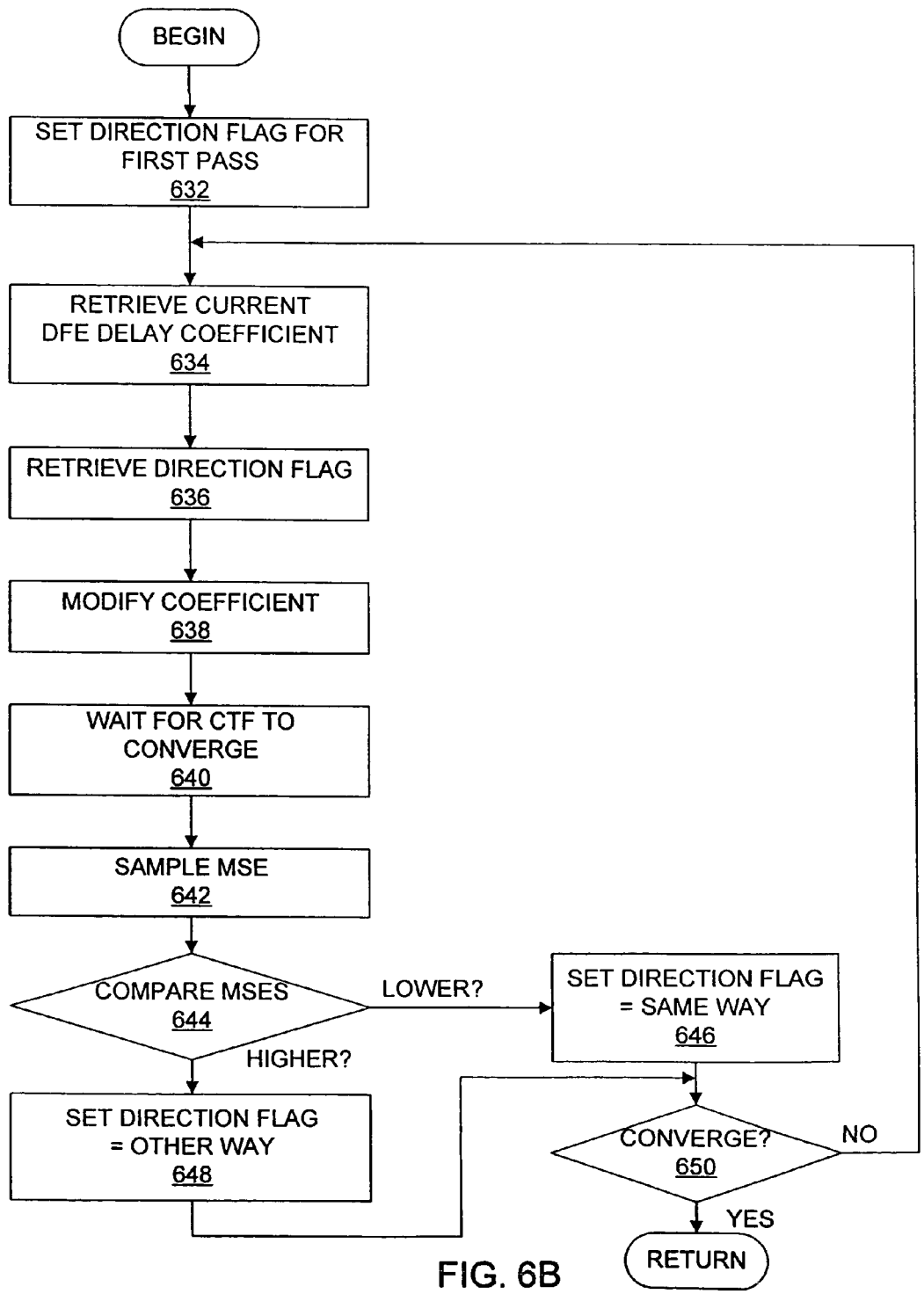
Figure 6C:
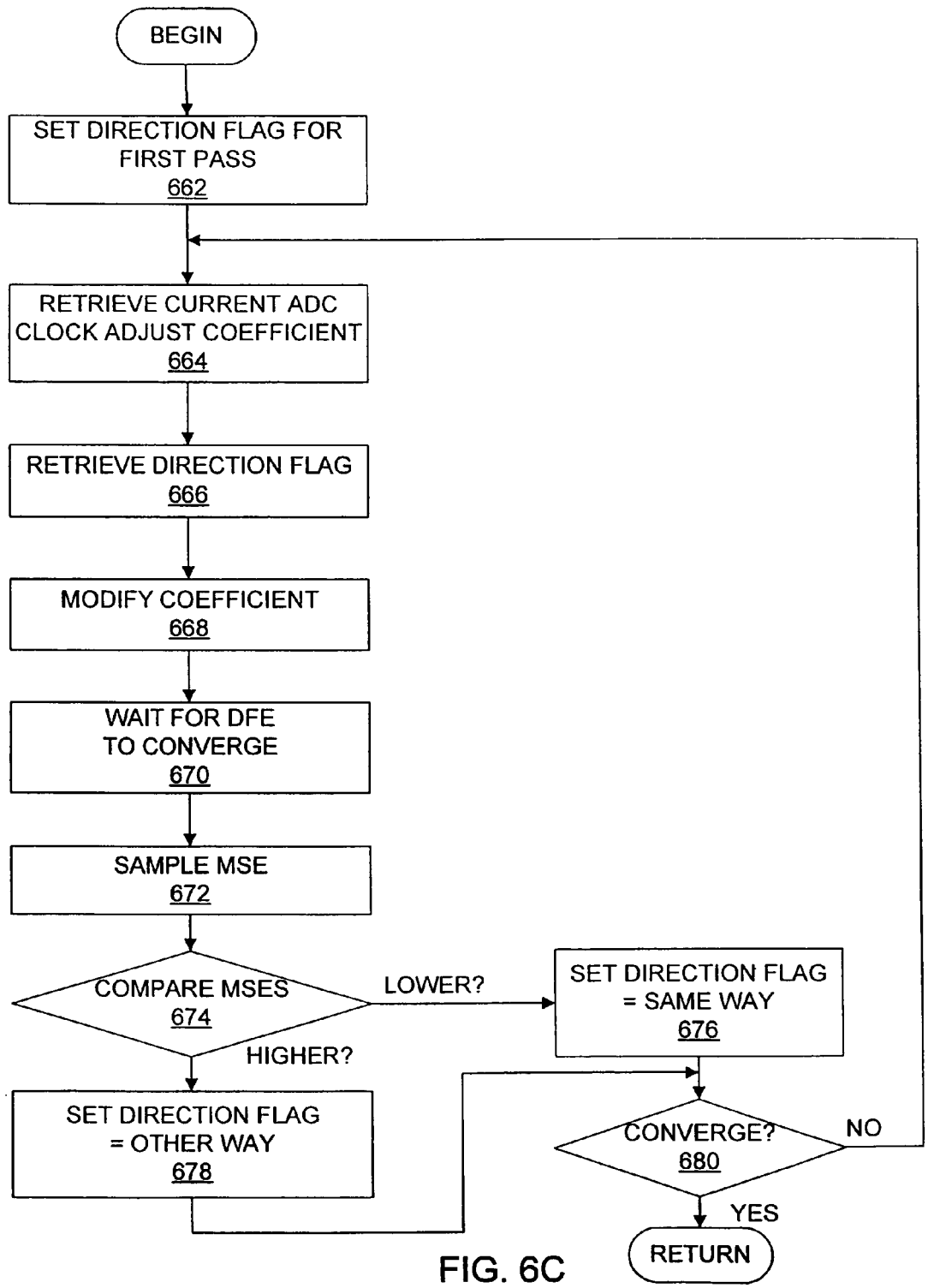

Referring now to FIGS. 6A-6C one embodiment of nested dithering algorithm operations will be discussed. In this example, the dithering algorithm adjusts the bandwidth of the CTF, the phase delay of the DFE path and the delay of the ADC clock as described above in conjunction with FIG. 4.

Figure 7:
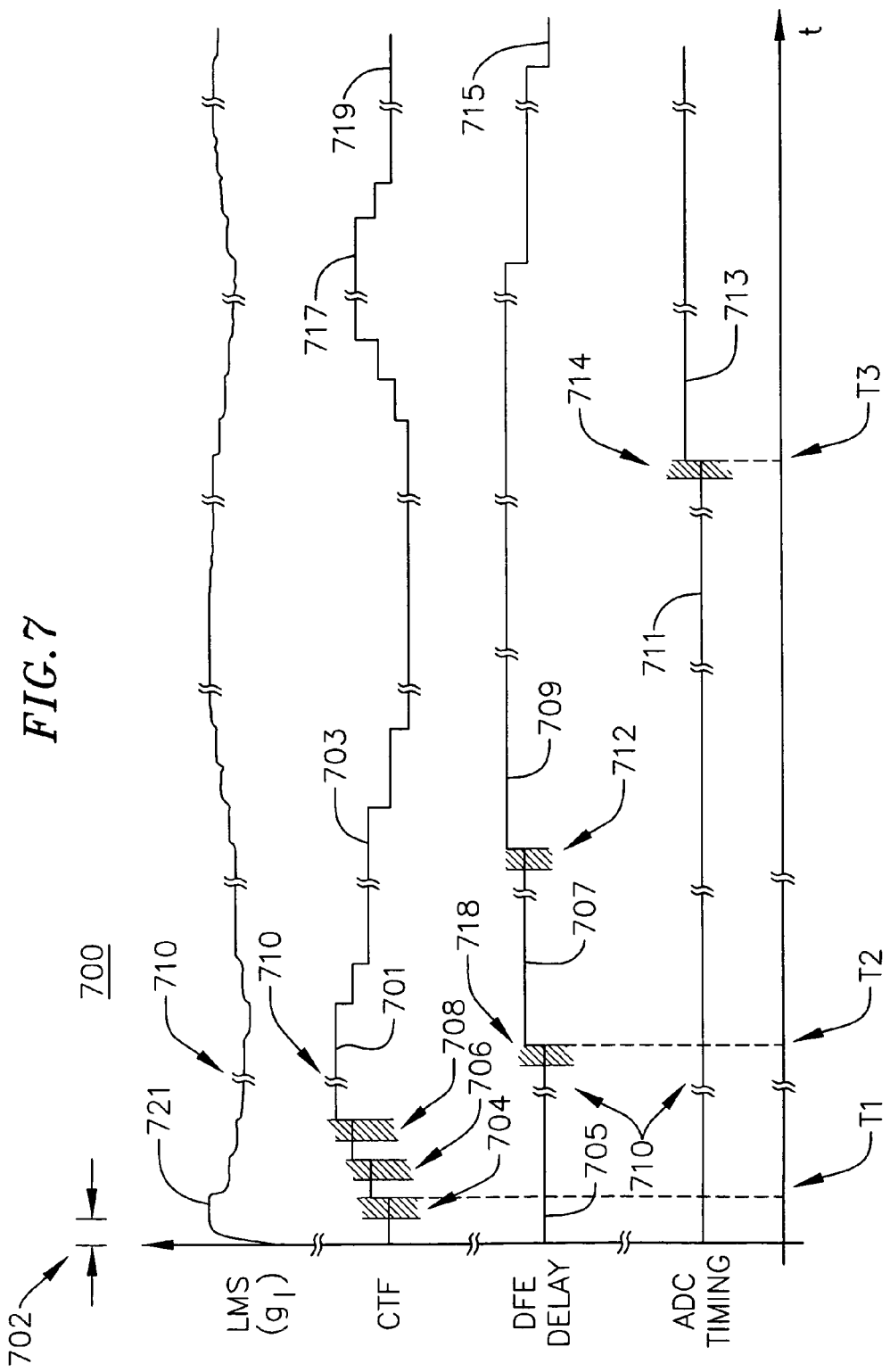
FIG. 7 is a simplified diagram of one embodiment of dithering timing in accordance with the invention.

The nested nature of the control of these signals by the dithering algorithm is described graphically in FIG. 7. Briefly, the algorithm first adjusts the signal 474 for the CTF until the algorithm converges for this adjustment. In general, the algorithm may be deemed to have converged when a value of the CTF coefficient is found that provides the smallest SSE or MSE (for convenience only the term MSE will be used in the discussion that follows).

In practice, however, it may be more efficient to define the convergence by the selecting a maximum number of adjustments for a given coefficient. For example, based on tests it may be determined that convergence for the CTF occurs in practically all cases within 20 adjustments of the bandwidth. Accordingly, the operation of the algorithm may be simplified by terminating the adjustment of the coefficient after the defined number of adjustments.

After the CTF coefficient converges at a given value (e.g., the coefficient is increased until it reaches a value represented by level 701 in FIG. 7), the value of the DFE delay coefficient is adjusted (e.g., from level 705 to level 707). The algorithm then re-adjusts the CTF coefficient until convergence is reached again (e.g., at level 703). Depending on whether the MSE increased or decreased, the DFE coefficient is adjusted in an appropriate direction (e.g., to level 709). The above process is repeated until the DFE coefficient converges (e.g., at level 709).

Next, the value of the ADC timing coefficient is adjusted (e.g., from level 711 to level 713). The algorithm then re-adjusts the DFE coefficient until convergence is reached again (e.g., at level 715). As noted above, convergence of the DFE coefficient involves several convergences of the CTF coefficient as represented by, for example, levels 717 and 719. Depending on whether the MSE increased or decreased, the ADC coefficient is adjusted in an appropriate direction (not shown). The above process is repeated until the ADC coefficient converges (not shown).

Referring again to FIGS. 6A-6B, FIG. 6A describes operations for converging the CTF coefficient, FIG. 6B describes operations for converging the DFE coefficient, and FIG. 6C describes operations for converging the ADC coefficient.

As represented by block 602 in FIG. 6A, when the CTF algorithm is initiated, a direction flag may be set to specify an initial direction (e.g., increase) for altering the CTF coefficient.

As represented by blocks 604-608, the algorithm modifies the current coefficient by, for example, retrieving the current bandwidth coefficient (e.g., initial value=2), retrieving the direction flag and modifying the coefficient according to the direction flag (e.g., new value=3).

Typically, a modification of the bandwidth of the CTF will cause the LMS algorithm circuit 456 (FIG. 4) to adjust the values of the feedback coefficients g1 and g2. This may occur because the prior values of the coefficients g1 and g2 may not provide the optimum scaling of the feedback signals to reduce ISI in input signals that are bandlimited by the new bandwidth of the CTF. Accordingly, as represented by block 610 the algorithm waits for the LMS algorithm to converge to the new values of g1 and g2 before determining the effect of the new bandwidth coefficient on the MSE.

As represented by block 612 the algorithm samples the error signals to calculate a new MSE. To provide an accurate (e.g., noise free) measurement of MSE the error signals may need to be sampled over a relatively long period of time. For example, 1000 error samples may be taken to generate an MSE. In this way, variations in the MSE due to, for example, the data pattern or transient noise may be reduced or eliminated.

Next, at block 614, the algorithm compares the new MSE with the prior MSE. If the new MSE is lower (i.e., smaller) the algorithm sets the direction flag to indicate that the bandwidth coefficient should be adjusted in the same direction (e.g., increased to 4) at block 616. If, on the other hand, the new MSE is higher (i.e., larger) the algorithm sets the direction flag to indicate that the bandwidth coefficient should be adjusted in the opposite direction (e.g., decreased to 1) at block 618.

As represented by block 620 the algorithm determines whether convergence has been reached. This may involve, for example, checking a counter to determine the number of times the bandwidth coefficient has been modified in the current adjustment cycle. If convergence has not been reached the algorithm returns to block 604 and the cycle continues. If convergence has been reached this cycle of the algorithm terminates.

Referring now to FIG. 6B, dithering algorithm operations for the DFE delay adjust will now be discussed. As this flowchart is similar to the flowchart of FIG. 6A, several of these operations will be discussed briefly. Initially, as represented by blocks 632-638, the algorithm sets a direction flag, then modifies the DFE coefficient according to the value of the direction flag.

As represented by block 640, the algorithm waits for the CTF dithering algorithm (FIG. 6A) to converge to the new value of the bandwidth coefficient before determining the effect of the new DFE coefficient on the MSE. As discussed in conjunction with FIG. 6A, a complete cycle (e.g., twenty iterations) of the CTF loop is performed during this block.

Then, as represented by blocks 642-644 the algorithm compares the new MSE that resulted from the new value of the DFE coefficient (and perhaps a new value of the CTF coefficient) with the prior MSE. As represented by blocks 646-650, the direction flag is set according to the effect of the new coefficient(s) on MSE and, after convergence of the coefficient (e.g., twenty cycles through the loop), the algorithm terminates.

Referring now to FIG. 6c, dithering algorithm operations for the adjusting the ADC clock timing (e.g., the DLL delay) will now be discussed. As this flowchart is similar to the flowcharts of FIGS. 6A and 6B, several of these operations will be discussed briefly. Initially, as represented by blocks 662-668, the algorithm sets a direction flag, then modifies the ADC coefficient according to the value of the direction flag.

As represented by block 670, the algorithm waits for the DFE dithering algorithm (FIG. 6B) to converge to the new value of the DFE delay coefficient before determining the effect of the new ADC coefficient on the MSE. As discussed in conjunction with FIG. 6B, a complete cycle (e.g., twenty iterations) of the DFE loop is performed during this block.

Then, as represented by blocks 672-674 the algorithm compares the new MSE that resulted from the new value of the ADC coefficient (and perhaps new values of the CTF and DFE coefficients) with the prior MSE. As represented by blocks 676-680, the direction flag is set according to the effect of the new coefficient(s) on MSE and, after convergence of the coefficient (e.g., twenty cycles through the loop), the algorithm terminates.

Referring again to FIG. 7, one example of nested loop timing will be discussed in more detail. The four graphs, from top to bottom, depict on the y axis example magnitudes of the coefficients for the LMS algorithm (e.g., g1), the CTF dithering algorithm, the DFE dithering algorithm and the ADC (DLL) dithering algorithm. For convenience of illustration, all four graphs have been combined into a single figure. Hence, the magnitudes of the coefficients are not intended to illustrate actual relative magnitudes of the coefficients.

The y axis denotes a time line t. As represented by the symbols 710 in the graphs, the time line t has been broken to show events that occur at later times. In other words, the time line t is not linear.

The first portion of the graph is identified as time period 702. During this time period the LMS algorithm adjusts the value of g1 until the algorithm converges at the end of time period 702. After the time period 702, g1 remains at a relatively constant value designated level 721.

Once the LMS algorithm has converged, the CTF dithering algorithm samples the error signals over a time period designated by the hatched area 704. At the end of the sampling period 704, the value of the CTF coefficient is increased. At this point the LMS algorithm again adjusts the value of g1 until convergence is reached. This process is repeated with subsequent CTF sampling periods 706 and 708, adjustments to the CTF coefficient and corresponding changes in g1. Eventually, the CTF algorithm converges as represented by level 701.

After the CTF algorithm converges, the DFE algorithm samples MSE during sampling period 718 then increases the value of the DFE coefficient up to level 707. Eventually the CTF algorithm converges again (level 703) after which the DFE algorithm samples MSE during sampling period 712 then increases the value of the DFE coefficient up to level 709.

Eventually the DFE algorithm converges after which the ADC algorithm samples MSE during sampling period 714. The ADC algorithm then increases the value of the ADC coefficient from level 711 to level 713 and eventually the ADC algorithm converges.

Figure 8:
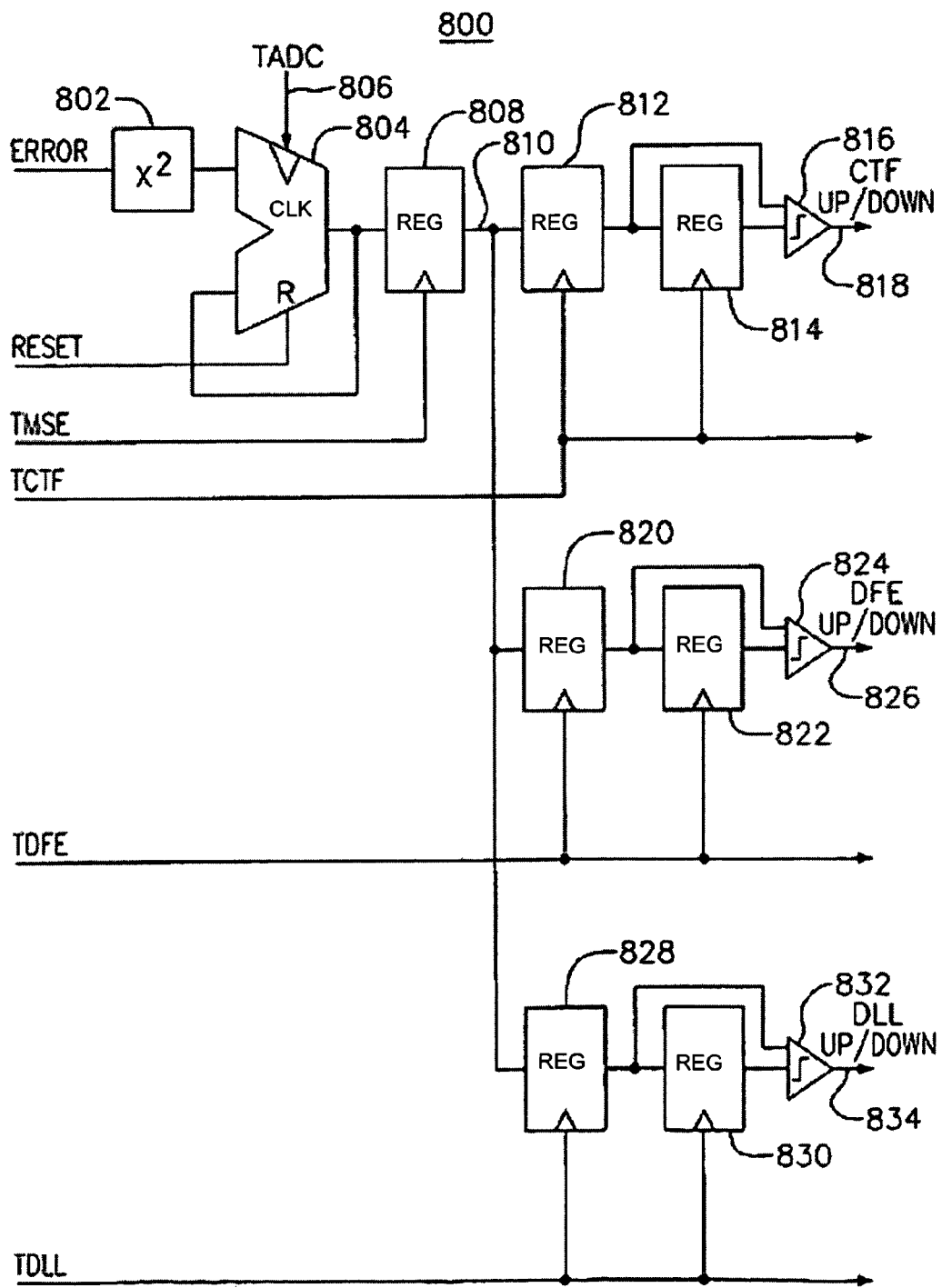
FIG. 8 is a simplified block diagram of one embodiment of a portion of a dithering algorithm timing circuit constructed in accordance with the invention.

In some embodiments, the rate at which the dithering algorithms for the CTF, DFE and ADC are initiated may be predefined. FIG. 8 depicts one embodiment of a timing circuit 800 that generates timing signals for initiating the three dithering algorithms.

After the error signal is squared by a squaring circuit 802, the squared error signals are summed and stored in a summer 804 according to a clock 806. For example, as illustrated in FIG. 4 the ADC clock 468 generates samples at a rate of 155 MHz.

After, for example, 2000 cycles of the ADC clock 468 a MSE timing signal TMSE clocks the contents of the summer 804 into a register 808 after which the summer 804 is reset via a reset signal. In this way, circuit 800 repeatedly calculates the MSE (or SSE in this case) over a period of 2000 samples and provides this value to three register 812, 820 and 828 via signal 810.

A CTF timing signal TCTF clocks the MSE signal 810 into a register 812. At the same time, the TCTF signal clocks the previous value stored in register 812 (the prior value of MSE for the CTF adjust) into a register 814. As a result, a comparator 816 may then compare the current value of MSE with the prior value of MSE to generate a signal 818 indicative of whether the MSE has increased or decreased as a result of the last change in the CTF coefficient. Thus, the signal 818 may be used to control adjustment of the CTF coefficient.

In the examples described above where CTF convergence is defined as 20 cycles, the speed of the TCTF clock may be equal to the speed of the TMSE signal. That is, there is one clock cycle of the TCTF signal for every clock cycle of the TMSE signal (and for every 2000 clock cycles of the TADC signal 806). However, to accommodate calculation of MSE for the DFE algorithm, one out of every twenty clock cycles of the TCTF signal may be disabled or ignored.

Similar timing signals and circuits may be provided for the DFE and DLL. For example, a TDFE signal operating at one twentieth of the speed of the TCTF signal may clock the MSE into registers 820 and 822 to enable a comparator 824 to output a signal 826 indicative of whether the MSE has increased or decreased as a result of the last change in the DFE coefficient. Here, to accommodate calculation of MSE for the DLL algorithm, one out of every twenty clock cycles of the TDFE signal may be disabled or ignored.

Finally, a TDLL signal operating at one twentieth of the speed of the TDFE signal may clock the MSE into registers 828 and 830 to enable a comparator 832 to generate a signal 834 indicative of whether the MSE has increased or decreased as a result of the last change in the DLL coefficient.

The timing relationships of FIG. 8 may be represented by times T1, T2 and T3 in FIG. 7. For example, T1 may correspond to 2000 cycles of the TACD signal 806, T2 may correspond to 20×2000 cycles of the TACD signal 806, and T3 may correspond to 20×20×2000 cycles of the TACD signal 806.

It should be appreciated that the timing set forth above is merely one example. A variety of different timing relationships may be used in a system that incorporates the teachings of the invention. In the examples given above, the loops are not entirely independent. Accordingly, each loop is to be defined so that it is invoked at a different rate than the other loops. For example, the relative timing of the loops may be based on the time constant of each loop. Here, the time constant of a loop may be defined as the time in which the coefficient settles to 1/e of its final value. In general, to maintain the stability of the loops it is desirable to adjust the coefficients for each loop at a rate that ensures that the coefficient for the loop will not be changed for a period of time that is less than the time constant of the next fastest loop. In the embodiment of FIG. 8 each nested loop is invoked at a relatively conservative rate that is 20 times slower than the next fastest loop.

Typically, the nesting order for the dithering algorithm may depend on the rate at which the corresponding errors to be corrected occur. In general, the loops that compensate for variations that change at a faster rate will be invoked more frequently.

For example, the LMS algorithm is used to correct errors caused by the characteristics of the channel such as polarization mode dispersion. These characteristics may change relatively frequently due to external conditions. Such changes may be particularly prevalent in relatively long channels.

The continuous time filter also may be used to compensate for changes in the channel such a chromatic dispersion. However, since the decision feedback equalizer typically provides more powerful equalization, the LMS algorithm may be performed more often than the continuous time filter algorithm.

While the decision feedback equalizer path delay adjust may provide some compensation for the channel characteristics, the adjustments for the decision feedback equalizer path delay primarily correct slowly varying conditions such as temperature and power supply drift or relatively constant conditions such a process variations. Similarly, the adjustments for the analog to digital converter timing primarily correct these types of slowly varying conditions or relatively constant conditions. Accordingly, the algorithms for these components may be performed at a slower rate.

From the above it should be appreciated that a system constructed in accordance with the invention may provide equalization and other processing (e.g., timing recovery) that may be adapted according to a common criterion such as square error. Moreover, the adjustments may be performed in a nested manner (e.g., as discussed above) to improve the stability of the system. Although some of the above embodiments describe these techniques in conjunction with specific circuits and operations, it should be apparent that the teachings herein may be applied to a variety of applications. For example, adjustments may be made to a variety of clock recovery schemes and circuits (e.g., synchronous symbol timing, etc.). A clock recovery circuit may be adjusted, for example, using a bias control signal or a timing offset signal. Adjustments may be made to a variety of adaptive equalization schemes and circuits including, for example, feed forward equalization and decision feedback equalization. Adjustments may be accomplished using, for example, a least mean square algorithm and/or dithering to reduce square error associated with one or more signals in the system.

Figure 9:
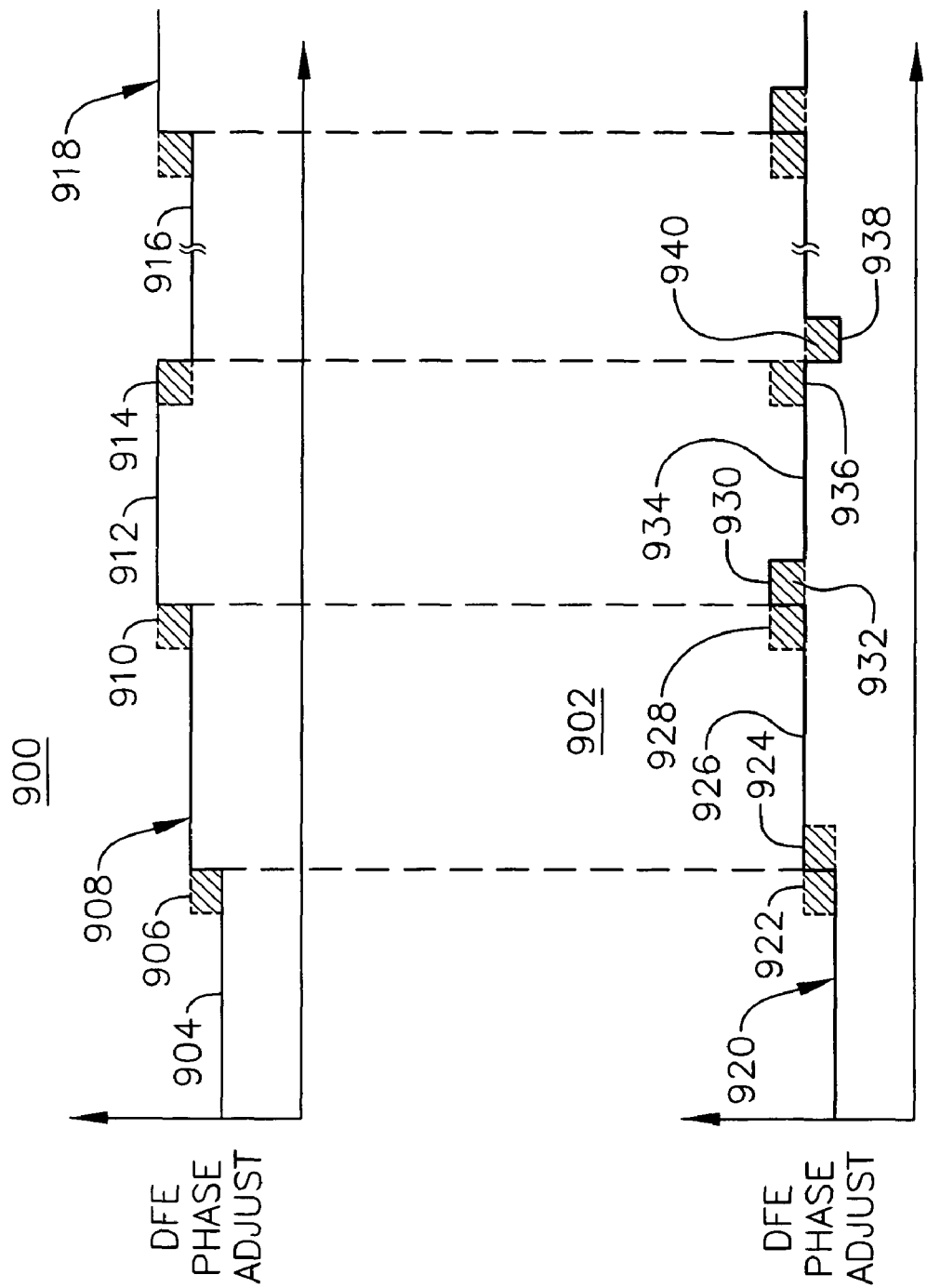
FIG. 9 is a simplified diagram of one embodiment of dithering timing in accordance with the invention.
Figure 10:
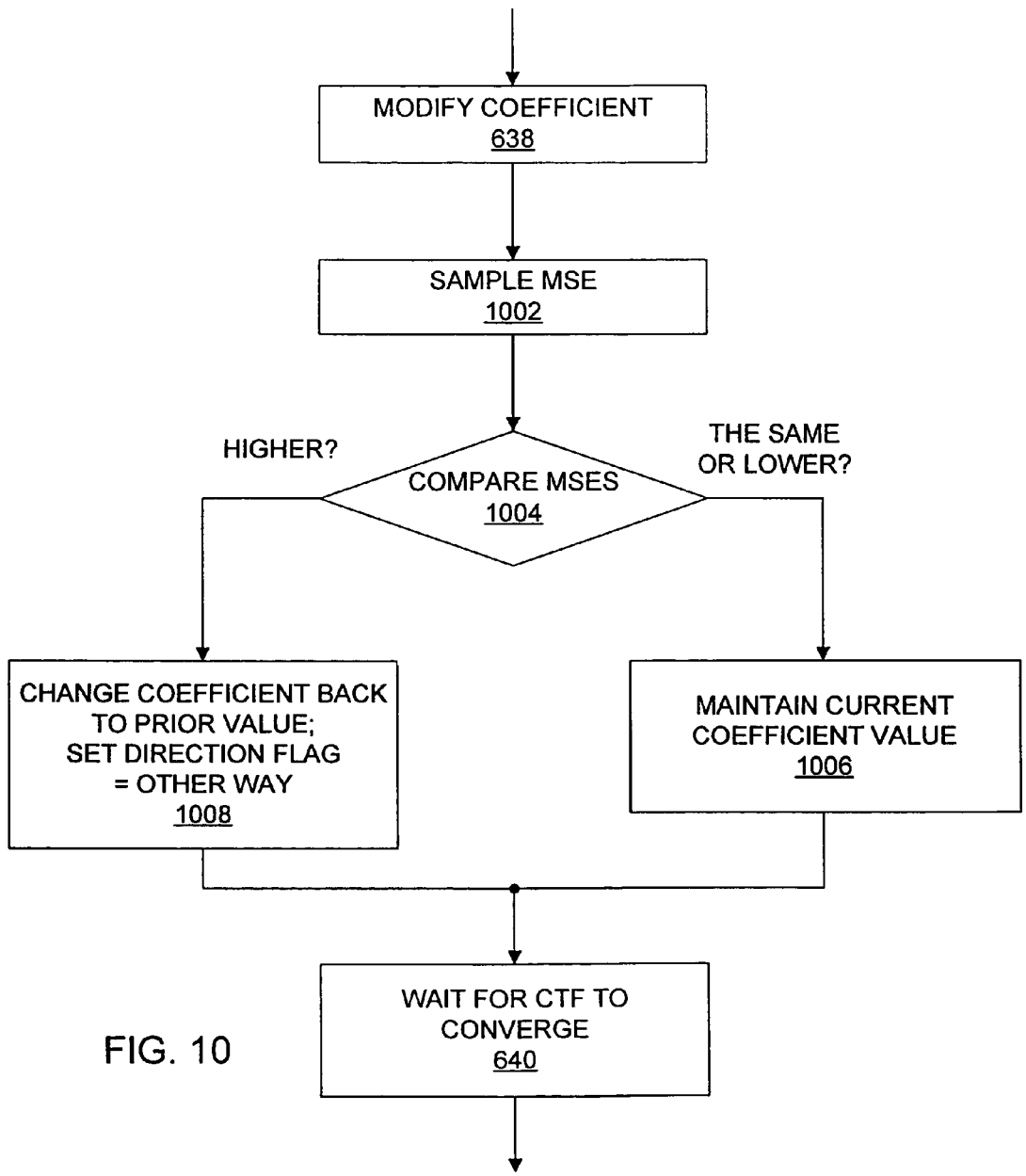
FIG. 10 is a flow chart of one embodiment of dithering operations that may be performed in accordance with the invention.

Referring now to FIGS. 9 and 10, another embodiment of a dithering algorithm will be discussed. FIG. 9 includes two timing diagrams 900 and 902 that illustrate different ways to adjust a coefficient. FIG. 10 is a flowchart that illustrates operations that may be performed to provide the coefficient adjustments shown in timing diagram 902.

The timing diagram 900 illustrates one method of adjusting a coefficient such as the DFE phase coefficient. Initially, the coefficient is at a value represented by level 904. The shaded portion 906 represents the time during which the DFE dithering algorithm samples the MSE after the CTF algorithm has converged as discussed above. After sampling indicates that the MSE has decreased, the coefficient is increased to a value represented by level 908. After another sampling 910 indicates that the MSE has decreased again, the coefficient is increased to the value represented by level 912. This time, however, the subsequent sampling 914 indicates that the MSE has increased. As a result, the coefficient is decreased back to the prior value as represented by level 916. A drawback of this algorithm is that even when one value for the coefficient (e.g., the coefficient value associated with level 908) provides a lower MSE than all the other values, the algorithm will not keep the coefficient set at that optimum value. Rather, the algorithm will continue to change the value of the coefficient, as represented by level 918, in an attempt to determine whether the next coefficient value provides a lower MSE.

The timing diagram 902 illustrates one way of maintaining the coefficient at an optimum value for a longer period of time. The operations associated with this diagram will be discussed in conjunction with FIG. 10. The operations described in FIG. 10 may be performed between the operations 638 and 640 in FIG. 6B.

Initially the coefficient is set to a value represented by level 920. After sampling 922 indicates that the MSE has decreased, the coefficient is increased to a value represented by level 926 (block 638). As represented by block 1002, instead of waiting for the CTF algorithm to converge, the dithering algorithm may immediately re-sample the MSE (shaded area 924) and compare the new MSE with the MSE from sampling 922 (block 1004) to determine whether the MSE has immediately increased as a result of the adjustment of the coefficient. As represented by block 1006, if the MSE has not increased the coefficient is left at the new value (level 926). After convergence of the CTF algorithm (block 640), the DFE algorithm again samples the MSE (shaded area 928) to determine the effect of the adjustment of the coefficient to level 926 on the MSE (FIG. 6B).

If an improvement is indicated, the coefficient is increased to a value represented by level 930 (block 638). Again, the dithering algorithm immediately samples the MSE (shaded area 932) to determine whether the MSE has immediately increased (block 1002). If, at block 1004, MSE has-increased, the dithering algorithm may immediately change the coefficient back to its prior value as represented by level 934 (block 1008). In addition, the algorithm may change the value of the direction flag so that the algorithm will adjust the coefficient in the opposite direction during the next pass through the loop.

The dithering algorithm repeats this procedure as represented by level 938 and shaded areas 936 and 940 to maintain the coefficient at an optimum value for the majority of the time. As shown in FIG. 9, in this example the optimum level is maintained for all but the sampling period.

It should be appreciated that the second sampling (e.g., sampling 924) may be performed at some time other than immediately after the coefficient is changed. Similarly, the coefficient may be changed back at some time other than immediately after it is determined that the MSE has increased. Performing these operations at any time before convergence occurs provides an advantage over the algorithm of FIG. 6 in that the coefficients for the loops may be maintained at optimum values for longer periods of time.

In some embodiments, the algorithm of diagram 902 is provided for slower loops such as the DFE path delay depicted in FIG. 9 and the ADC clock timing. This prevents these loops from staying at a less than optimum value for a relatively long period of time.

Figure 11A:
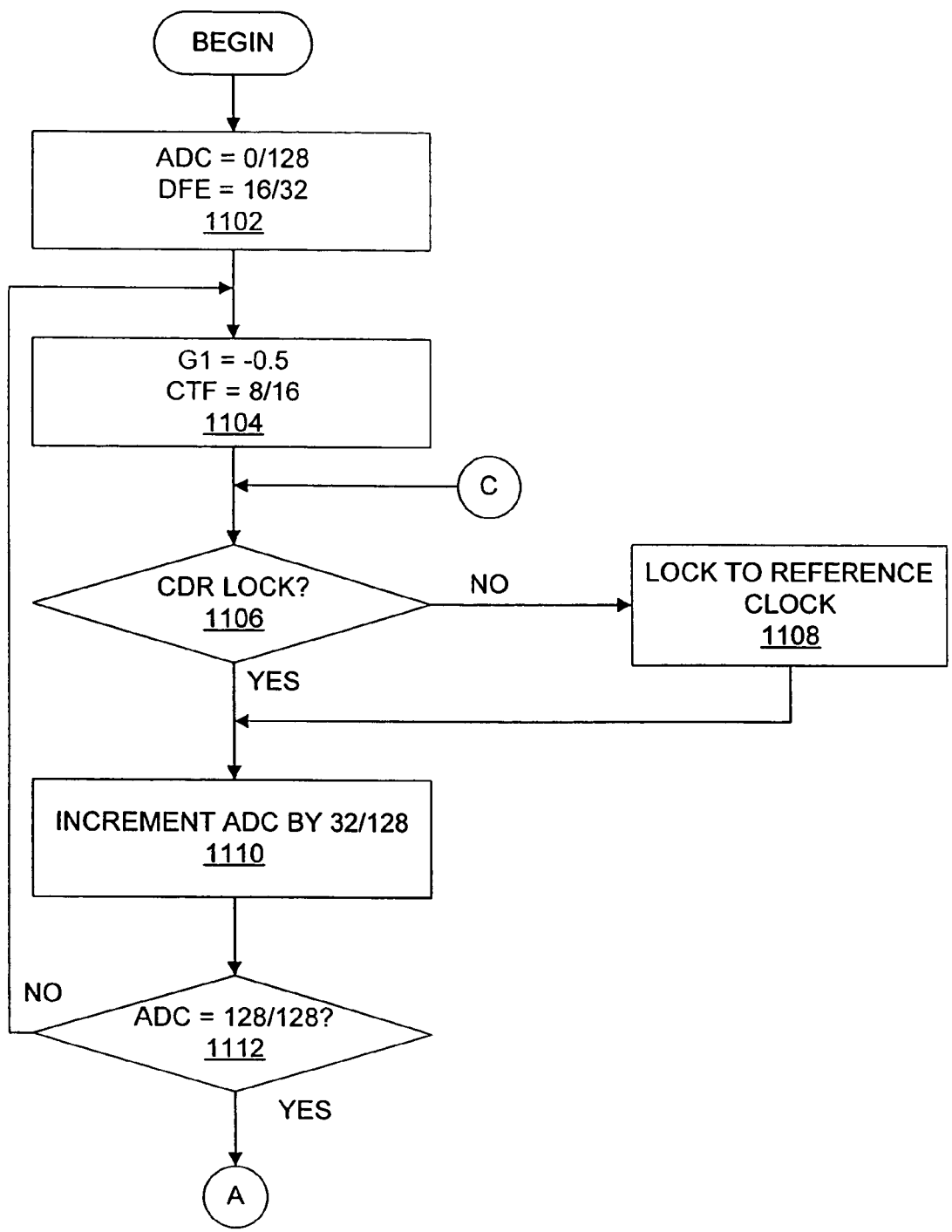
FIG. 11, consisting of FIGS. 11A, 11B and 11C, is a flow chart of one embodiment of dithering operations that may be performed in accordance with the invention.
Figure 11B:
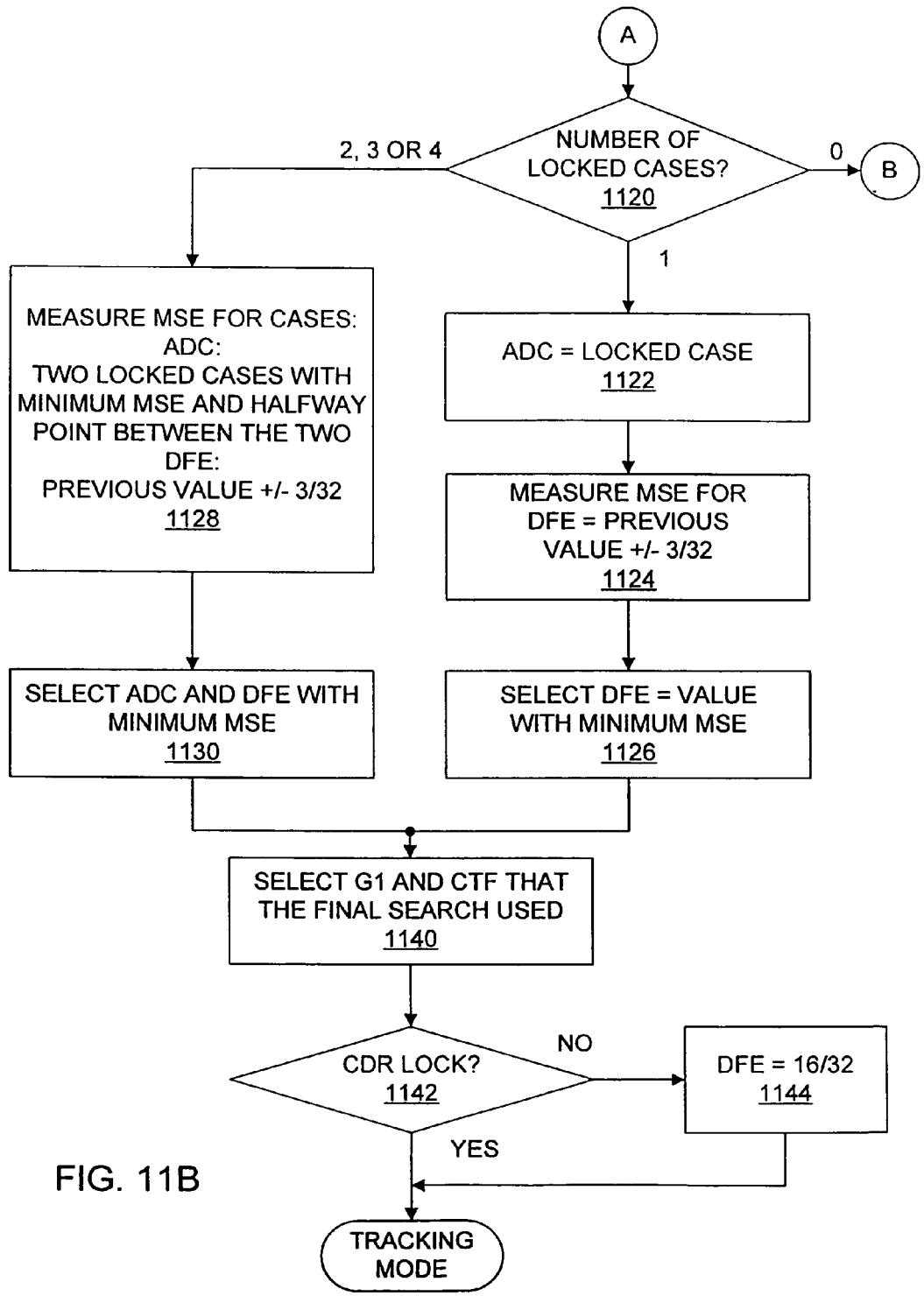
Figure 11C:
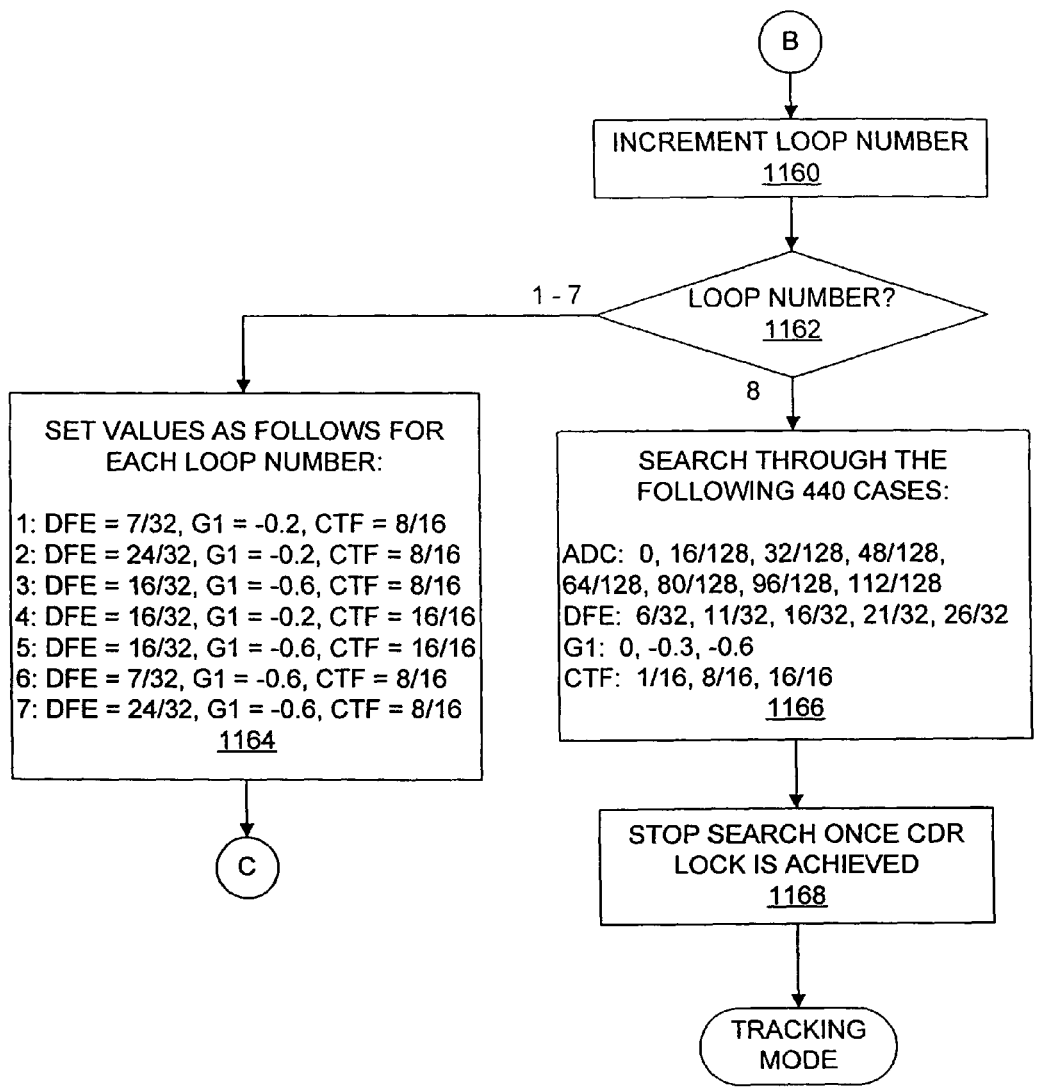

FIGS. 11A, 11B and 11C describe one embodiment of operations that may be performed to initialize the LMS, CTF, DFE and ADC coefficients. At block 1102 and 1104 the coefficients are set to an initial set of values. If, at block 1106, this set of values does not result in a lock condition for the phase lock loop in the clock and data recovery circuit ("CDR"), the phase lock loop is locked to a reference clock (block 1108). As represented by blocks 1110 and 1112, lock is checked for five different values of the ADC coefficient.

Referring to FIG. 11B, at block 1120 a different set of subsequent operations is selected depending on the number of times lock was achieved during the operations of FIG. 11A. As represented by block 1122, when lock was achieved only one time the ADC value is set to the value where lock was achieved. Next, at block 1124, MSE is measured for the previous value of the DFE coefficient $\pm^3/_{32}$. The DFE coefficient is then set to the value that produced the lowest MSE (block 1126).

As represented by block 1140, the LMS coefficient (g1) and the CTF coefficient are set to the values that were used in the final search. If, at block 1142, this set of values results in CDR lock the receiver is set to tracking mode and data acquisition may begin. Alternatively, if CDR lock was not achieved at block 1142, the DFE coefficient is set to $^{16}/_{32}$ (block 1144) then the receiver is set to tracking mode as above.

If, at block 1120, lock was achieved two, three or four times the MSE is measured for a combination of values of the ADC and DFE coefficients at block 1128. At block 1130, the ADC and DFE coefficient combination that produces the smallest MSE is selected. Processing then proceeds to block 1140 as discussed above.

FIG. 11C describes operations that may be performed when lock was not achieved during the initial operations in FIG. 11A. As represented by blocks 1160 and 1162, the operations involve eight passes through the loop defined by block 1164 continuing back to blocks 1106-1120. At block 1164 a different set of DFE, g1 and CTF coefficients are selected during each pass through the loops. The process then determines whether lock has been achieved (block 1106) with the selected set of coefficients (and the various values of the ADC coefficient set by block 1110). If lock is achieved, the process will exit this loop at block 1120.

As represented by block 1166, if lock is not achieved the process searches through a defined set of 740 cases. If lock is achieved for any of these cases (block 1168), the search is stopped and the receiver is set to tracking mode.

Figure 12:
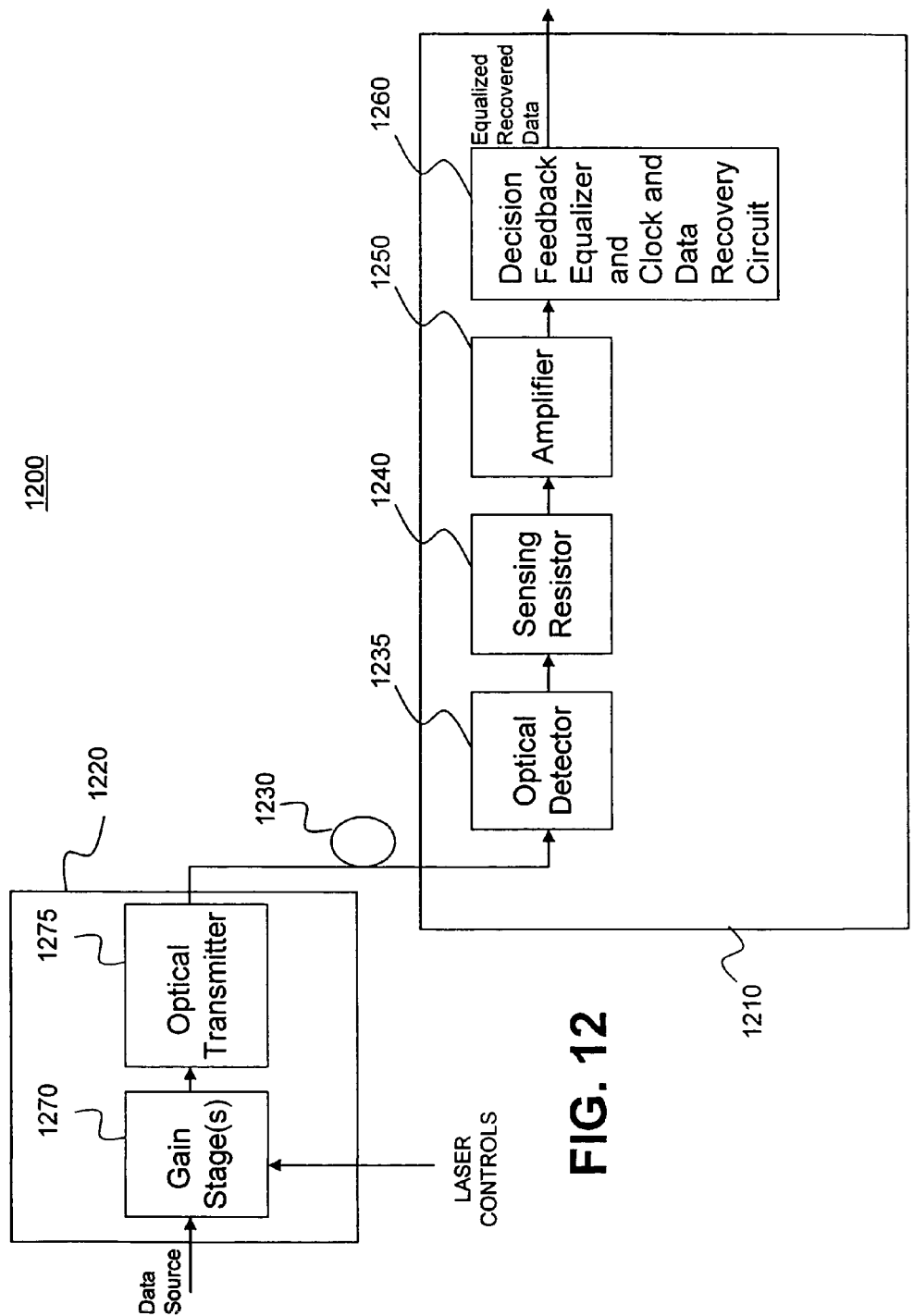
FIG. 12 is a simplified block diagram of one embodiment of an optical communication system constructed in accordance with the invention.

The system and method described herein may be integrated into any of a variety of applications. For example, referring to FIG. 12, the described exemplary dithering circuit may be incorporated into an optical receiver assembly 1210 of an optical communication system 1200. The optical system 1200 includes an optical transmitter 1220 and an optical fiber network 1230 that carries the optical signal to the optical receiver assembly 1210. Those skilled in the art will appreciate that the teachings of the invention are not limited to a single optical transmitter and receiver or to optical receivers. For example, practical optical communications systems may have one or more optical transmitters as well as one or more optical receivers.

The illustrated receive path includes an optical detector 1235, sensing resistor 1240, one or more amplifier(s) 1250, and an integrated decision feedback equalizer and clock and data recovery circuit 1260. The optical detector 1235 may comprise a known prior art optical detector implementation. Such prior art detectors convert incoming optical signals into corresponding electrical output signals that may be electronically monitored.

A transmit path includes, by way of example, one or more gain stage(s) 1270 coupled to an optical transmitter 1275. The gain stage(s) 1270 may have multiple stages, and may receive one or more control signals for controlling various different parameters of the output of the optical transmitter. In one embodiment an analog data source provides an analog data signal that modulates the output of the optical transmitter. In other embodiments, baseband digital modulation or frequency modulation may be used.

In this embodiment, the gain stage(s) 1270 amplify the incoming data signal from the data source according to laser control signals. The amplified data signal, in turn, drives the optical transmitter 1275.

The optical transmitter may, for example, be a light emitting diode or a surface emitting laser or an edge emitting laser that operate at high speeds such as 10 Gigabits per second ("Gbps") or higher. The optical transmitter 1275 thereby generates an optical data signal that provided to a fiber optic cable 1230.

The fiber optic cable 1230 carries the optical data signal to the optical detector 1235. In operation, when the transmit optical beam is incident on a light receiving surface area of the optical detector, electron-hole pairs are generated. A bias voltage applied across the optical detector 935 generates a flow of electric current having intensity proportional to the intensity of the incident light. In one embodiment, this current flows through sensing resistor 1240, and generates a voltage.

The sensed voltage is amplified by the one or more amplifier(s) 1250 and the output of amplifier(s) 1250 drives the integrated decision feedback equalizer and clock and data recovery circuit 1260. The decision feedback equalizer may include, by way of example, a slicer that generates a binary signal that drives a clock and data recovery circuit. The clock and data recovery circuit generates an extracted clock signal from the binary signal that is then used to retime the equalized data as discussed above. One example of an integrated decision feedback equalizer and clock and data recovery circuit is described in U.S. patent application Ser. No. 10/823,252, filed Apr. 10, 2004, the disclosure of which is hereby incorporated by reference herein.

A receiver constructed according to the invention may support various data protocols and date rates. For example, in one embodiment the receiver is a multi-rate SONET/SDH/ 10GE/FEC receiver that may operate at very high speeds including, for example, 9.953, 10.3125, 10.664 or 10.709 Gbps. This receiver includes, in a single chip solution, an optical equalizer and CDR as discussed above, a linear amplifier, deserializer and other components.

In one embodiment the receiver chip is implemented using CMOS technology. However, the teachings herein are applicable to other types of processes including for example, GaAs, Bi-MOS, Bipolar, etc. Moreover, different types of transistors such as NFETS and PFETS may be used to implement circuits according to the teachings herein.

A system constructed in accordance with the invention may be implemented in a variety of ways. For example, a dithering algorithm as taught herein may be used to control one, two or more loops. These loops may, in turn, control a variety of parameters or characteristics of a system including, but not limited to, the parameters discussed above.

Different embodiments of the invention may include a variety of hardware and software processing components. In some embodiments of the invention, hardware components such as controllers, state machines and/or logic are used in a system constructed in accordance with the invention. In some embodiment of the invention, code such as software or firmware executing on one or more processing devices may be used to implement one or more of the described operations.

Such components may be implemented on one or more integrated circuits. For example, in some embodiments several of these components may be combined within a single integrated circuit. In some embodiments some of the components may be implemented as a single integrated circuit. In some embodiments some components may be implemented as several integrated circuits.

The components and functions described herein may be connected/coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards.

The signals discussed herein may take several forms. For example, in some embodiments a signal may be an electrical signal transmitted over a wire while other signals may consist of light pulses transmitted over an optical fiber. A signal may comprise more than one signal. For example, a differential signal comprises two complementary signals or some other combination of signals. In addition, a group of signals may be collectively referred to herein as a signal.

Signals as discussed herein also may take the form of data. For example, in some embodiments an application program may send a signal to another application program. Such a signal may be stored in a data memory.

The components and functions described herein may be connected/coupled directly or indirectly. Thus, in some embodiments there may or may not be intervening devices (e.g., buffers) between connected/coupled components.

In summary, the invention described herein generally relates to an improved system and method for error reduction in received signals. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A method of processing a signal comprising:
   receiving the signal;
   processing, using a plurality of control loops, the received signal in accordance with a plurality of respective control signals;
   acquiring a plurality of error signals from the processed signal; and
   adjusting the respective control signals for the plurality of control loops in accordance with the plurality of error signals and a common error measurement criteria applied to each of the plurality of error signals.

2. The method of claim 1 wherein the error measurement criteria comprises a square error.

3. The method of claim 1 wherein the error measurement criteria comprises a mean square error.

4. The method of claim 1 wherein processing comprises clock recovery and at least one of the control signals provides a phase adjust for the clock recovery.

5. The method of claim 4 wherein processing further comprises decision feedback equalization and at least one of the control signals provides an equalization coefficient for the decision feedback equalization.

6. The method of claim 4 wherein processing further comprises continuous time filtering and at least one of the control signals provides a bandwidth adjust for the continuous time filtering.

7. The method of claim 4 wherein processing further comprises generating a sampling clock signal for an analog to digital converter and at least one of the control signals provides a phase adjust for generating the sampling clock signal.

8. The method of claim 1 wherein adjusting the respective control signals comprises performing dithering on the respective control signals.

9. The method of claim 1 wherein adjusting the respective control signals comprises performing nested dithering on the respective control signals.

10. The method of claim 1 wherein acquiring the plurality of error signals comprises sampling the processed signal.

11. The method of claim 1 wherein acquiring the plurality of error signals comprises sampling a soft decision signal associated with the received signal.

12. A system for processing a received signal comprising:
   at least one processing component configured to process the received signal, using a plurality of control loops, in accordance with a plurality of respective control signals;
   a plurality of error acquisition components configured to acquire a plurality of error signals from the processed signal;
   at least one error calculation component configured to calculate at least one measure of error in accordance with the plurality of error signals and a common error measurement criteria applied to each of the plurality of error signals; and
   at least one control signal generator configured to adjust the respective control signals in accordance with the at least one measure of error and the common error measurement criteria.

13. The system of claim 12 wherein the error measurement criteria comprises a square error.

14. The system of claim 12 wherein the error measurement criteria comprises a mean square error.

15. The system of claim 12 wherein the at least one processing component comprises a clock recovery circuit and at least one of the control signals provides a phase adjust for the clock recovery circuit.

16. The system of claim 15 wherein the at least one processing component further comprises a decision feedback equalizer and at least one of the control signals provides an equalization coefficient for the decision feedback equalizer.

17. The system of claim 15 wherein the at least one processing component further comprises a continuous time filter and at least one of the control signals provides a bandwidth adjust for the continuous time filter.

18. The system of claim 15 wherein the at least one processing component further comprises an analog to digital converter for sampling the processed signal and a lock loop circuit configured to generate a sampling clock signal for the analog to digital converter, wherein at least one of the control signals provides a phase adjust for the lock loop circuit.

19. The system of claim 18 wherein the processed signal comprises a soft decision signal.

20. The system of claim 12 wherein the at least one control signal generator is configured to adjust at least one of the control signals in accordance with a dithering algorithm.

21. The system of claim 12 wherein the at least one control signal generator is configured to adjust two or more of the plurality of control signals in accordance with a nested dithering algorithm.

22. A method of processing a signal comprising:
receiving the signal;
processing the received signal, using a plurality of control loops, in accordance with a plurality of respective control signals, the processing comprising:
 recovering at least one clock signal in accordance with at least a first one of the control signals; and
 applying adaptive equalization in accordance with at least a second one of the control signals;
acquiring a plurality of error signals from the processed signal; and
respectively adjusting, based on the plurality of error signals, a common error measurement criteria applied to each of the plurality of error signals, the at least first one of the control signals and the at least second one of the control signals to minimize a square error.

23. The method of claim 22 wherein the at least first one of the control signals is adjusted in accordance with dithering.

24. The method of claim 23 wherein the adaptive equalization comprises feed forward equalization or decision feedback equalization.

25. The method of claim 24 wherein the square error comprises a mean square error.

26. The method of claim 24 wherein the at least second one of the control signals is adjusted in accordance with a least mean square algorithm or dithering.

27. The method of claim 23 wherein the at least second one of the control signals is adjusted in accordance with a least mean square algorithm or dithering.

28. The method of claim 22 wherein the at least second one of the control signals is adjusted in accordance with a least mean square algorithm or dithering.

* * * * *